(12) United States Patent
Kamau

(10) Patent No.: US 7,797,880 B1
(45) Date of Patent: Sep. 21, 2010

(54) DECORATIVE POLE AND PEDESTAL STABILIZING CONTAINER

(76) Inventor: Maria N. Kamau, 630 Park View Dr. #306, Santa Clara, CA (US) 95054

( * ) Notice: Subject to any disclaimer, the term of this patent is extended or adjusted under 35 U.S.C. 154(b) by 863 days.

(21) Appl. No.: 11/542,821

(22) Filed: Oct. 4, 2006

(51) Int. Cl.
*A01G 9/02* (2006.01)

(52) U.S. Cl. .......................... 47/66.6; 47/66.1

(58) Field of Classification Search ................ 47/65.5, 47/66.1, 66.6, 86
See application file for complete search history.

(56) References Cited

U.S. PATENT DOCUMENTS

| | | |
|---|---|---|
| 2,799,972 A | 7/1957 | Teixeira |
| 5,493,976 A | 2/1996 | Hammond |
| 5,638,638 A | 6/1997 | Moskowitz |
| D386,114 S | 11/1997 | Carson |
| 6,085,459 A | 7/2000 | Conner |
| 6,381,902 B1 * | 5/2002 | Batshon .......................... 47/86 |
| 6,539,665 B1 | 4/2003 | Llona |
| 6,615,543 B1 * | 9/2003 | Palsrok .......................... 47/86 |
| D480,986 S | 10/2003 | Taylor |
| 2004/0216376 A1 * | 11/2004 | Missry ........................ 47/66.6 |

* cited by examiner

*Primary Examiner*—Timothy D Collins
*Assistant Examiner*—Monica Williams

(57) ABSTRACT

A container for substantially surrounding a pole and a base stand of a device such as a floor lamp is disclosed. The container includes a sidewall integrally attached to a base panel to form a ballast volume and a fixture void extending into the ballast void. The container can take on a variety of shapes and can be split into two sections comprising an upper planter section and a lower reservoir section. The upper planter section includes a ballast volume and a pole void and can include a plurality of drain ports with or without attached protruding hollow legs. The lower reservoir section includes a ballast volume, a watering port, and a base stand void extending into the ballast volume. A wedge section can be provided to partially close off the fixture void to define the aperture in which a freestanding device such as a floor lamp is housed.

16 Claims, 17 Drawing Sheets

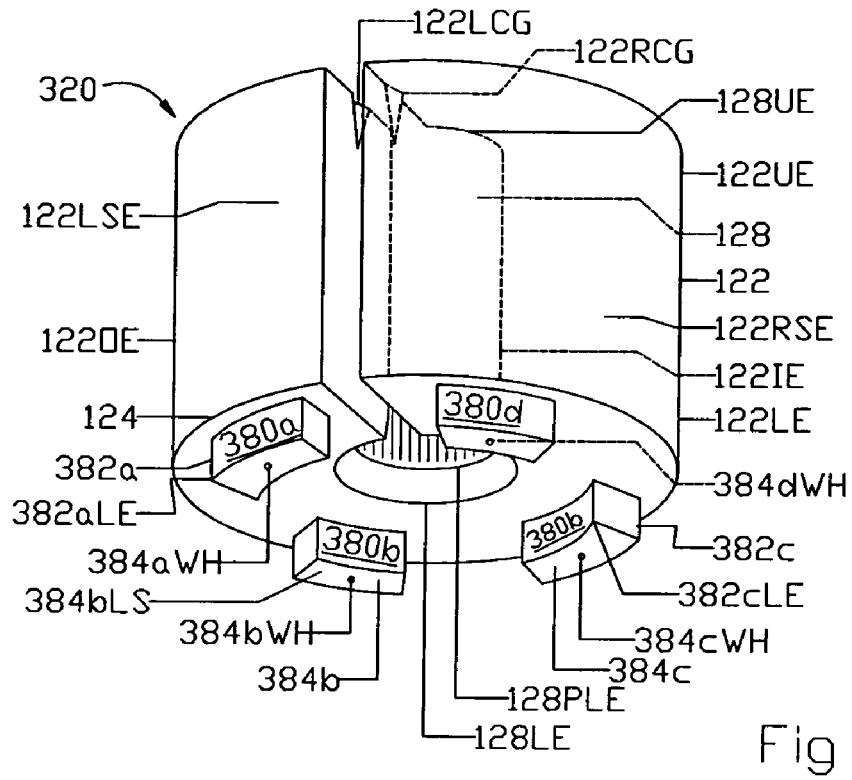
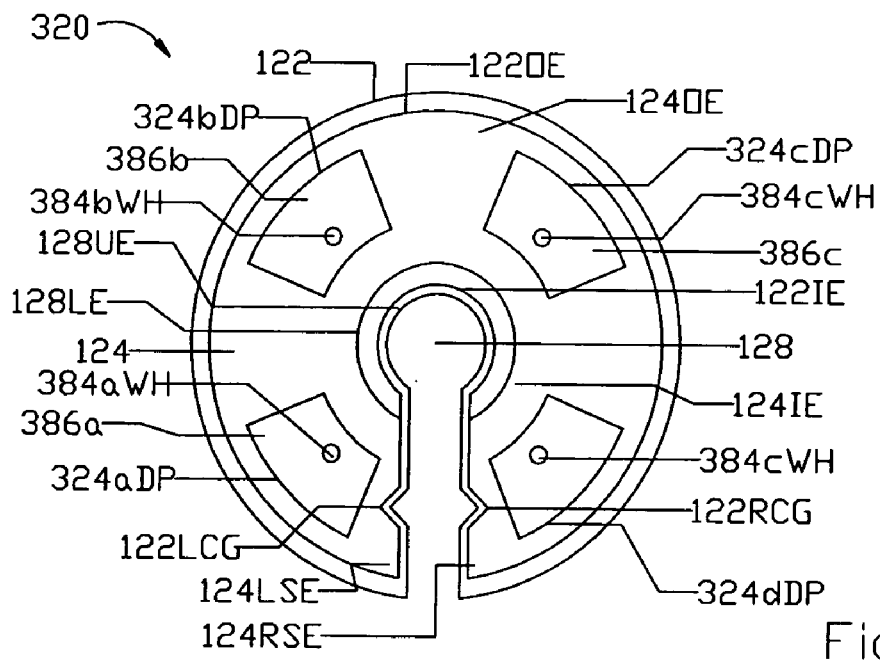
Fig 3a
Fig 3b

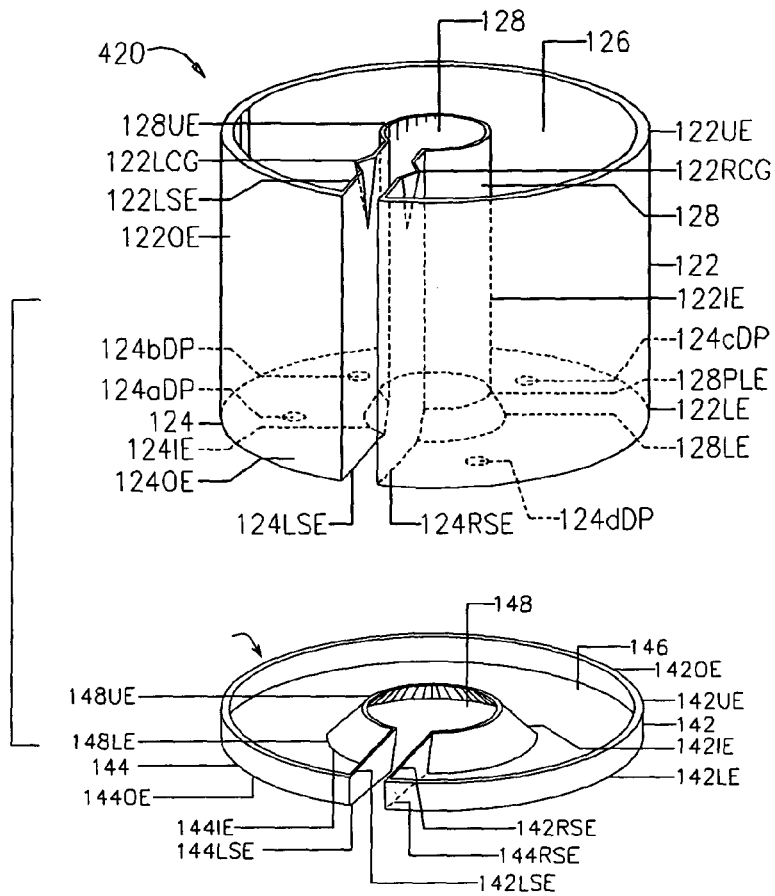
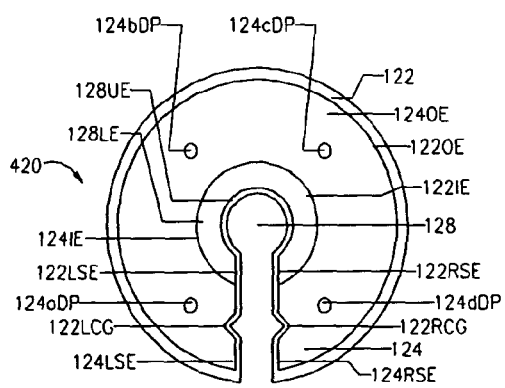
Fig 4a
Fig 4b
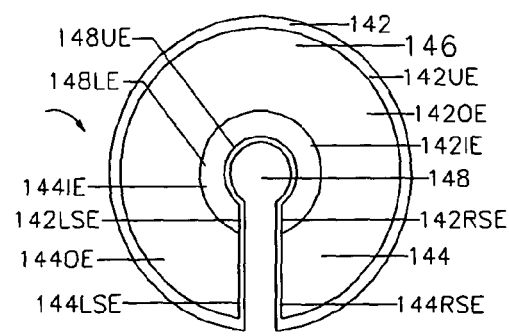
Fig 4c

DECORATIVE POLE AND PEDESTAL STABILIZING CONTAINER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

This invention relates to containers, specifically to plant receptacles used in combination with freestanding devices that have a pole and a base stand, such as a floor lamp.

2. Prior Art

Common freestanding fixtures such as floor lamps, floor fans, coat stands, hat stands, and patio sun umbrellas come equipped with a pole and a base stand. Often the base stands provided with such fixtures have at least one if not both of the following problems. Firstly, the base stands are too small or too lightweight to offer sufficient stability from accidental tip-over if bumped. Secondly, the base stands are often aesthetically incompatible with the home or office décor.

Previously, prior art designs mitigate the aforementioned problems by creating a contact buffer to keep foot and pet traffic away from the freestanding fixture. Additionally, prior art designs lessen the effect of an aesthetically incompatible base stand of a freestanding fixture by providing a receptacle to contain beautiful plant life or flowers and to serve as a visual alternative.

Usually, construction of a contact buffer and a visual alternative involve placing multiple units of the conventional planters or prior art around or adjacent to the base stand, or affixed to the poles, of the freestanding fixture. This method tends to clutter and crowd floor space, thus creating a trip hazard. Also, this method tends to be expensive if base stands of several freestanding fixtures in a room need contact buffers or need visual alternatives created around them.

Prior art designs that attempt to create a contact buffer or visual alternative around the freestanding fixture ignore the need to actually stabilize the fixture should it nevertheless get bumped. Furthermore, prior art designs additionally ignore the need to economize or tidy the floor space in a room.

Many people enjoy decorating household, office, or outdoor areas with plants or ballast held in a container. Prior art designs that attempt to integrate containers with freestanding fixtures tend to be fixture-specific such as a table-top planter for a patio umbrella assembly or a mail box planter for mail boxes with square posts. Consequently, the prior art is adaptable only to specific types of fixtures, requiring that a different type of planter be used for each different type of fixture. This creates aesthetic disharmony in a given room or outdoor setting.

U.S. Pat. No. 6,539,665 issued on April 2003 to Llona discloses a planter having a vertical rabbet for conformably engaging a generally upright elongated member.

U.S. Pat. No. 5,493,976 issue on February 1996 to Hammond discloses a tray for use on a table about an upwardly extending projection, such as an umbrella pole.

U.S. Pat. No. 2,799,972 issued on July 1957 to Teixeira discloses a vessel for growing orchids and other rhizomatous plants.

U.S. Pat. No. D386114 issued on November 1997 to Carson discloses an ornamental design for a tree collar planter.

U.S. Pat. No. D480986 issued on October 2003 to Taylor discloses a post planter disengage-ably attached to a support post of a deck or porch. The post planter is attached at any height along the support post, and is made of two sections that wrap around the support post, and are held by clips at the top and a mounting mechanism that is attached to the support post.

U.S. Pat. No. 6,085,459 issued on July 2000 to Conner discloses a vase container for use with a table umbrella assembly. The vase includes a two-part lightweight plastic construction where the respective halves are secured to an upright table umbrella pole.

Until now, prior art planter inventions have failed to simultaneously stabilize, aesthetically harmonize, and decorate freestanding fixtures. Attempts made by most prior art inventions have marginally addressed only one of the three aforementioned functions or advantages. For instance, U.S. Pat. No. 6,539,665 to Llona, U.S. Pat. No. 5,493,976 to Hammond, U.S. Pat. No. 2,799,972 to Teixeira, U.S. Pat. No. D386114 to Carson, U.S. Pat. No. D480986 to Taylor and U.S. Pat. No. 6,085,459 to Conner, each has only provided a container with which to decorate a fixture, that partially or wholly surrounds the pole of a particular fixture.

The aforementioned inventions could not be useful in stabilizing and concealing a base stand of a freestanding fixture. In fact, some of the aforementioned prior art aggressively seek stability from the pole or post of a fixture itself by means of nails, brackets, clips, or other permanent attachments.

To create a contact buffer Teixeira's invention would require an assembly of several units; even so, this would still not stabilize the base stand of a freestanding fixture. In addition, using multiple planter units arrayed about a freestanding fixture would pose a trip hazard or crowd and clutter floor space.

A closer look at FIGS. 7 and 8 of U.S. Pat. No. D386114 to Carson and FIG. 11 of U.S. Pat. No. 5,493,976 to Hammond, show a portion of a uniformly vertical sidewall that defines a gap for admitting a vertical elongate member. The vertical uniformity of the gap illustrates inability of these prior arts to substantially surround the lower portion of a pole and the entire base stand of a device such as a floor lamp. Even if these two prior arts were made large enough to envelop both the pole and base stand of a floor lamp, for instance, the resulting massive lateral u-shaped gap would not provide ornamentation or stability to the base stand of a freestanding fixture such as a floor lamp. Consequently, if the fixture was bumped, Carson's and Hammond's inventions would not restricts lateral movement of the base stand enough to deter the fixture from overturning if the fixture were to fall in a direction aligned with the gap.

Carson's invention serves only to decorate by providing a plant-growing container adapted to poles of items already stabilized by a subterranean anchor, such as a tree planted in the ground. Hammond's invention serves only as a utility container adapted to poles of items already stabilized by a patio umbrella assembly.

OBJECTS AND ADVANTAGES

Accordingly, several objects and advantages of the present invention are:

to provide a container that stabilizes a freestanding fixture by minimizing wobbling of the base stand once the fixture is bumped.

to provide a container that stabilizes a freestanding fixture by creating a contact barrier that discourages accidental bumping by foot or pet traffic.

to provide a container that decorates the freestanding fixture by surrounding the fixture with an attractive planter that can be filled with plant life or aesthetically pleasing ballast such as glass marbles.

to provide a container that can be adapted to various freestanding fixtures, such as a floor fan, a coat stand and a floor lamp, in a room or an outdoor setting.

to provide a container that can be used in conjunction with other similar container members to unify a decorating theme.

to provide a container that is easily assembled and disassembled and that does not require disassembling the freestanding fixture.

to provide a container that does not derive stability from the freestanding fixture by means of screws, nails, clips or brackets.

to provide a container that economizes floor space by surrounding and sharing the same general location with the freestanding fixture.

to provide a container that can have various configurations and aesthetic designs.

to provide a container that is easy to assemble and use, that can be mass-produced in an automated and economical manner, and is readily affordable by the consumer.

Further objects and advantages will become apparent from a consideration of ensuing description and drawings.

SUMMARY OF THE INVENTION

The present invention provides a container for substantially surrounding a pole and a base stand of a generally upright elongated member such as a floor lamp.

The container invention includes a sidewall and a base panel. The sidewall includes an upper end and a lower end spaced from the upper end and defines sides of a cavity. The base panel integrally attaches to the lower end of the sidewall to form a ballast volume and a fixture void extending into the ballast volume. The ballast volume holds and contains ballast or soil for plants to grow therein. The fixture void receives and houses a pole and a base stand of a generally upright elongated member.

Alternatively, the container invention can be separated into an upper planter section and a lower reservoir section. The sidewall and the base panel of the upper planter section integrally combine to form a ballast volume and a pole void and can include a plurality of drain ports with or without integrally attached protruding hollow legs. The sidewall and the base panel of the lower reservoir section integrally combine to form a water volume and a base void and can include a watering port.

The container invention can take on a variety of shapes and can include a wedge section to partially close off the fixture void.

BRIEF DESCRIPTION OF THE DRAWINGS

Drawing

Figures

In the drawings, closely related figures have the same number but different alphabetic suffixes.

FIG. 1a shows bottom perspective view of an upper planter section with plurality of protruding hollow legs, and also shows top perspective views of a lower reservoir section and a wedge section.

FIG. 1b shows top view of upper planter section and plurality of protruding hollow legs.

FIG. 1c shows top view of lower reservoir section.

FIG. 1d shows top perspective view of the upper portion of the wedge section.

FIG. 1e shows top perspective view of the lower portion of the wedge section.

FIG. 1f shows top perspective view of a protruding hollow leg.

FIG. 1g shows top view of wedge section.

FIG. 2a shows bottom perspective view of upper planter section with plurality of tri-sectional circumferentially shaped protruding hollow legs.

FIG. 2b shows top view of upper planter section with plurality of tri-sectional circumferentially shaped protruding hollow legs.

FIG. 3a shows bottom perspective view of upper planter section with a plurality of tetra-sectional circumferentially shaped protruding hollow legs.

FIG. 3b shows top view of upper planter section with a plurality of tri-sectional circumferentially shaped protruding hollow legs.

FIG. 4a shows top perspective view of alternative design of upper planter section with a plurality of longitudinal through-holes or drain ports without the associated plurality of protruding hollow legs.

FIG. 4b shows top view of alternative design of upper planter section with a plurality of longitudinal through-holes or drain ports without the associated plurality of protruding hollow legs.

FIG. 4c shows a top view of an alternate design of the lower reservoir section.

Figure 5A:
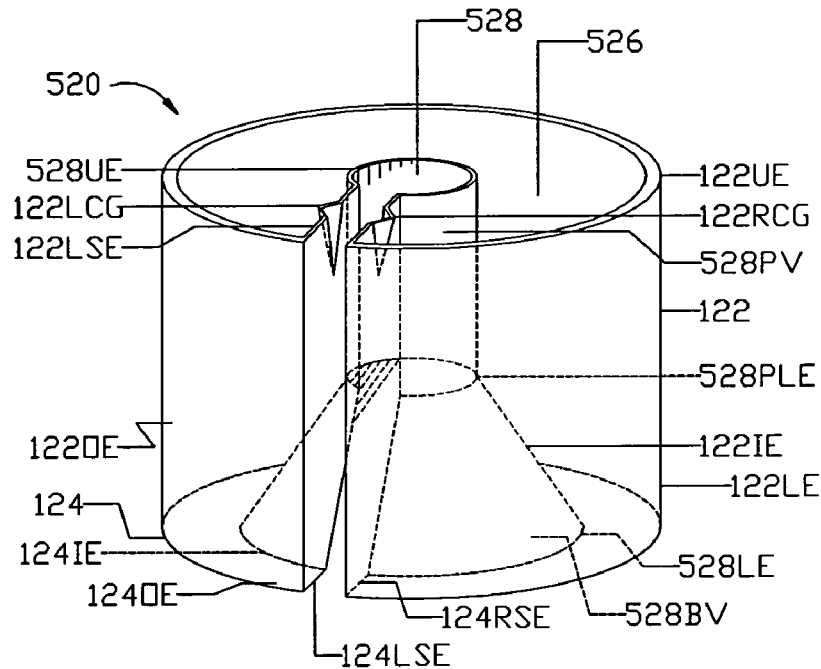

FIG. 5a shows top perspective view of a planter section resulting from combining upper planter section and lower reservoir section.

Figure 5B:
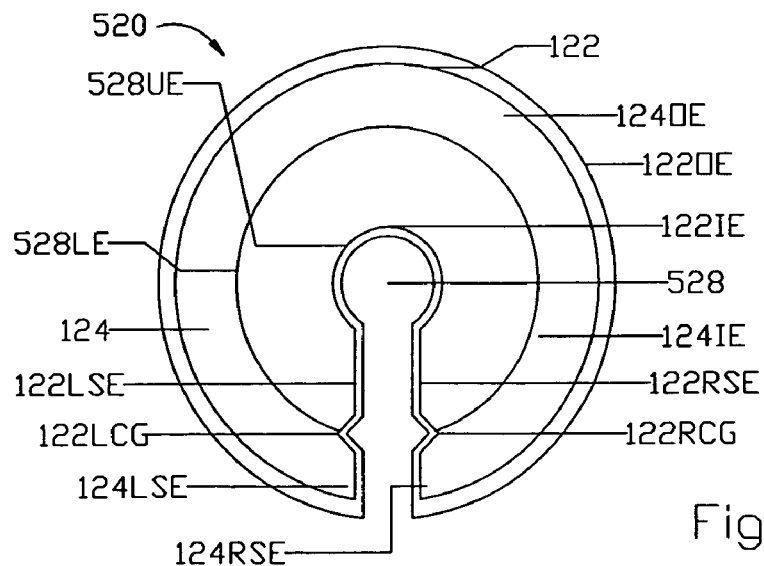

FIG. 5b shows top view of planter section.

Figure 5C:
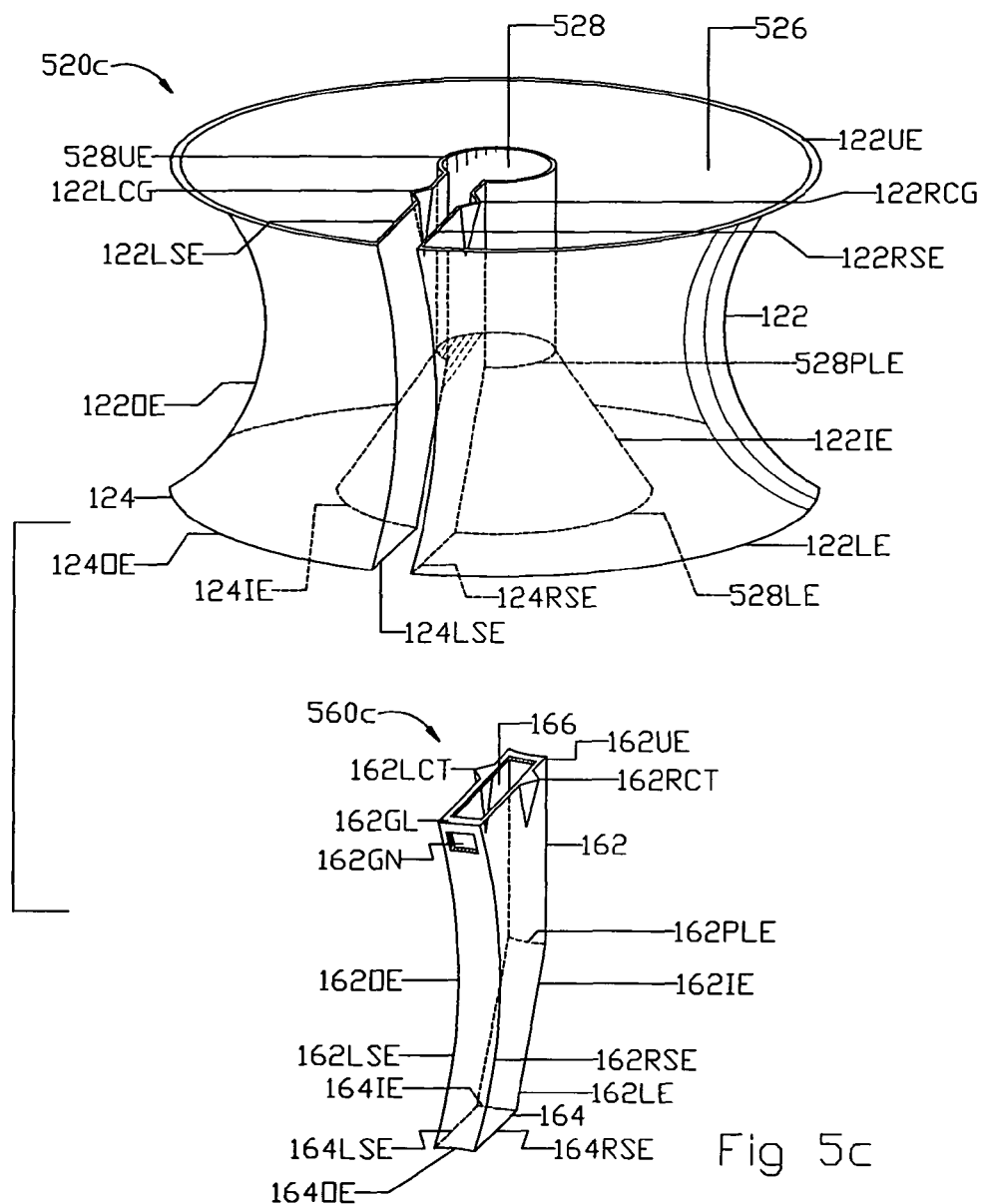

FIG. 5c shows a top perspective view of planter section shaped as a concave cylinder and also shows a top perspective view of a corresponding wedge section shaped such that it conforms to the concave cylinder shaped planter section. For simplicity, wedge section is shown without the electric cord tunnel.

Figure 5D:
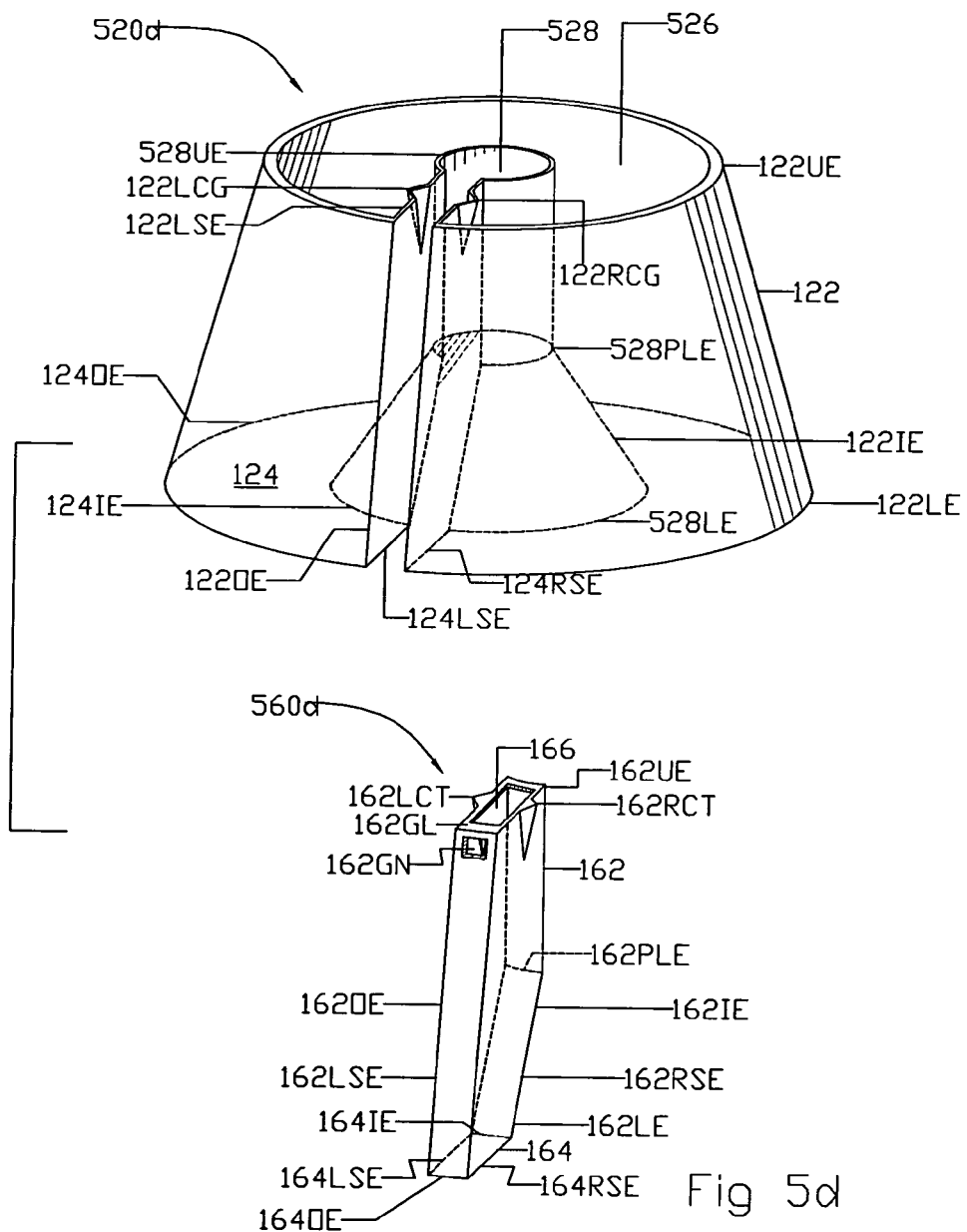

FIG. 5d shows a top perspective view of planter section shaped as a truncated upright cone and also shows a top perspective view of a corresponding wedge section shaped such that it conforms to the truncated upright cone shaped planter section. For simplicity, wedge section is shown without the electric cord tunnel.

Figure 6A:
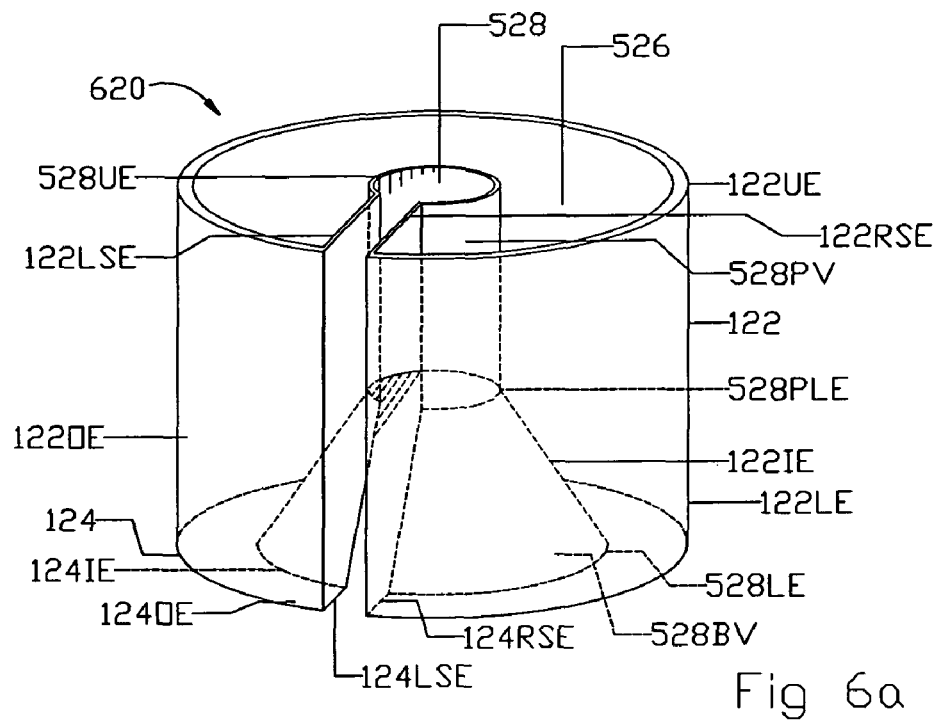

FIG. 6a shows top perspective view of a planter section without the left and right connecting grooves.

Figure 6B:
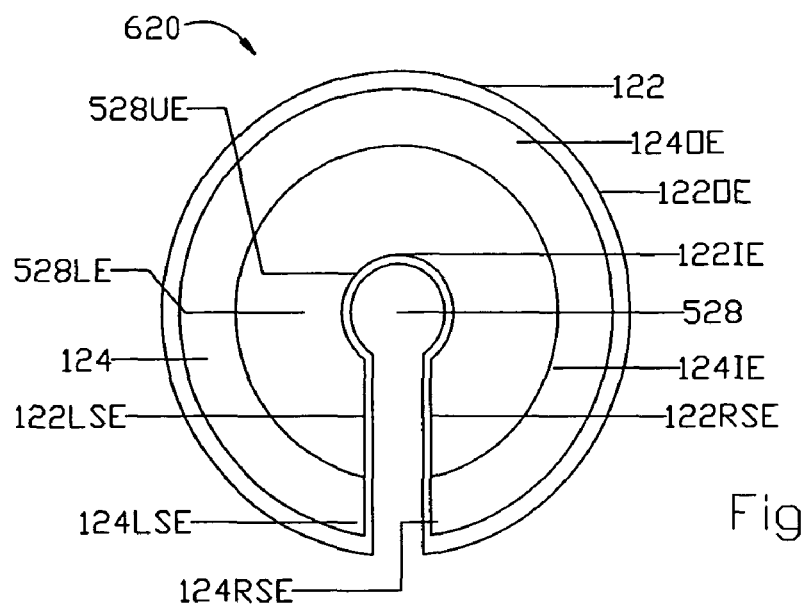

FIG. 6b shows top view of a planter section without the left and right connecting grooves.

Figure 6C:
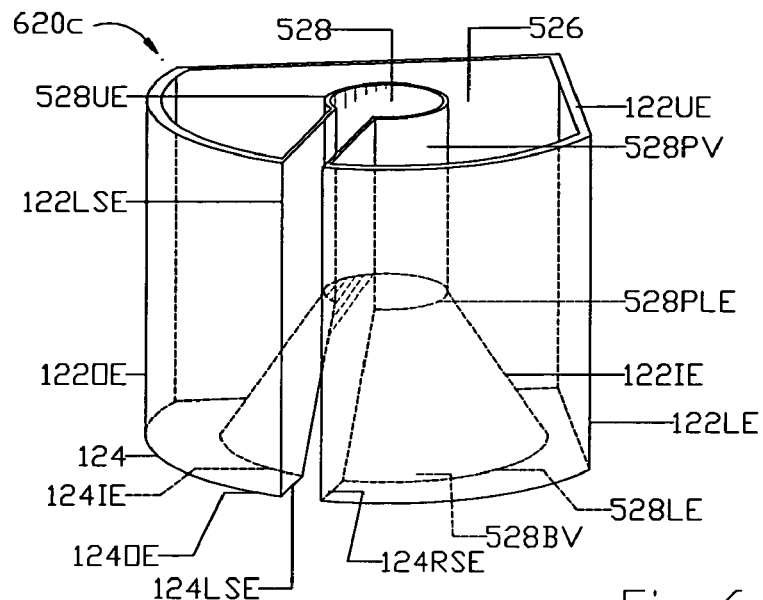

FIG. 6c shows top perspective view of planter section without the left and right connecting grooves and shaped as a quarter cylinder.

Figure 6D:
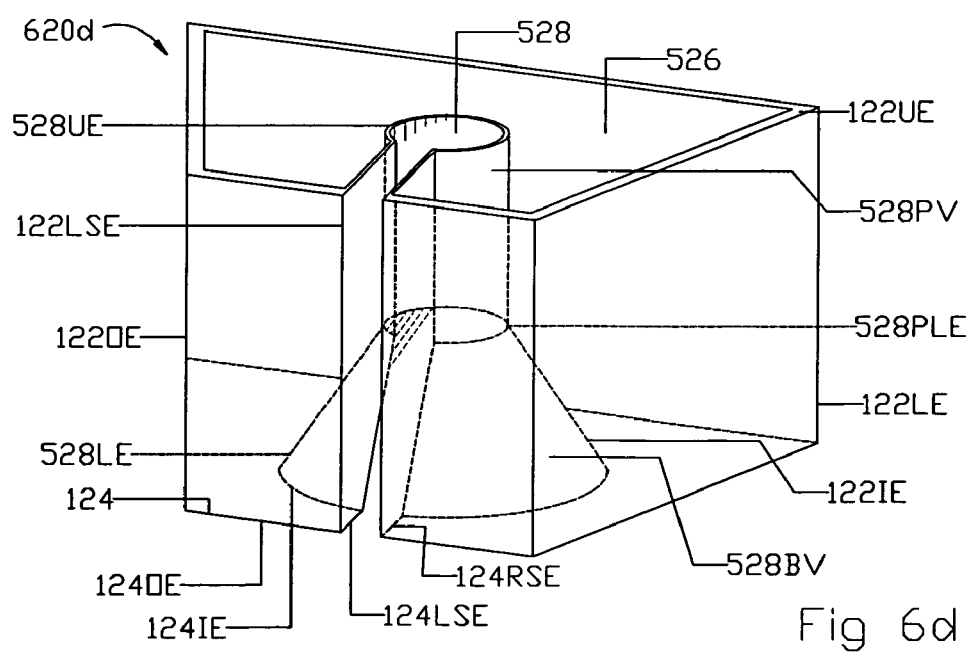

FIG. 6*d* shows top perspective view of a planter section without the left and right connecting grooves and shaped as a trapezoid.

Figure 6E:
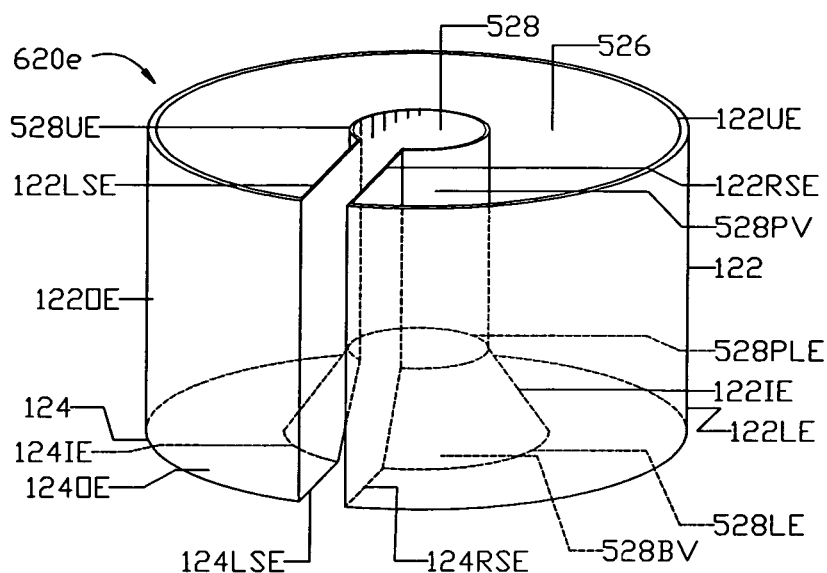

FIG. 6*e* shows top perspective view of a planter section without the left and right connecting grooves and having a fixture void with a truncated upright cone shaped base void.

Figure 6F:
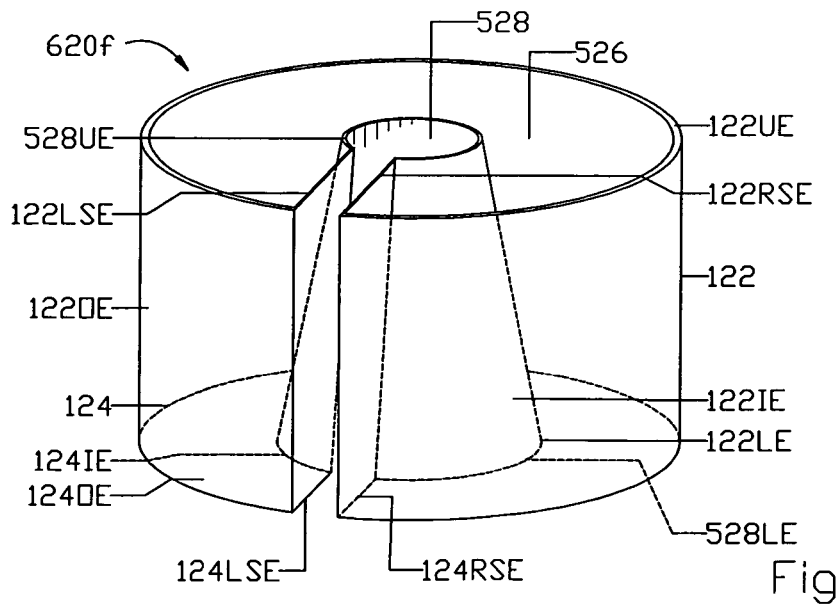

FIG. 6*f* shows top perspective view of a planter section without the left and right connecting grooves and having a truncated upright cone shaped fixture void.

Figure 6G:
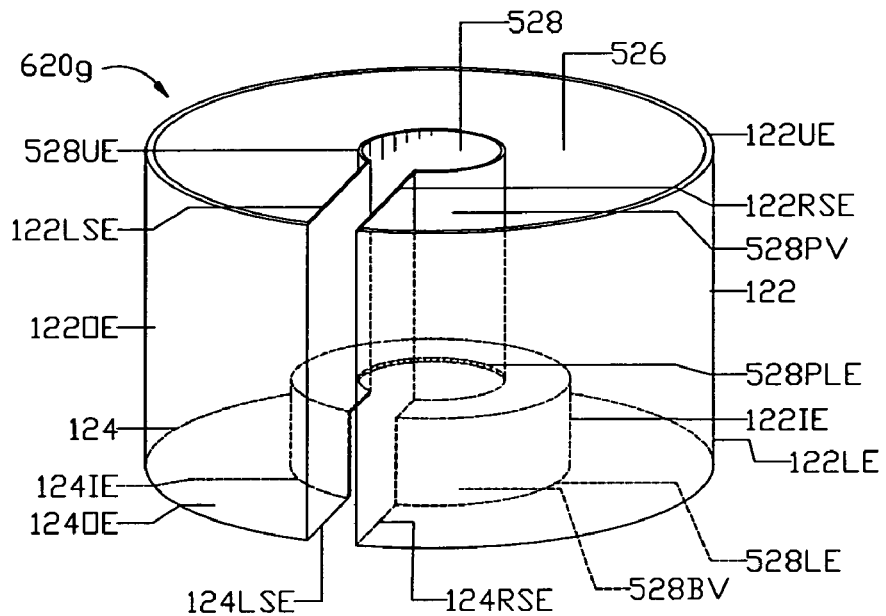

FIG. 6*g* shows top perspective view of a planter section without the left and right connecting grooves and having a thick cylindrical shaped base void.

Figure 6H:
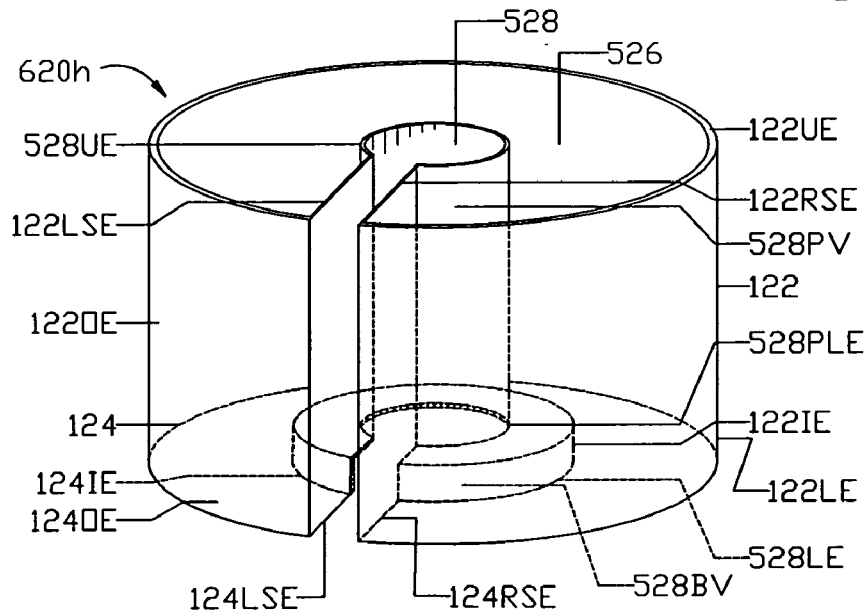

FIG. 6*h* shows top perspective view of a planter section without the left and right connecting grooves and having a thin cylindrical shaped base void.

Figure 6I:
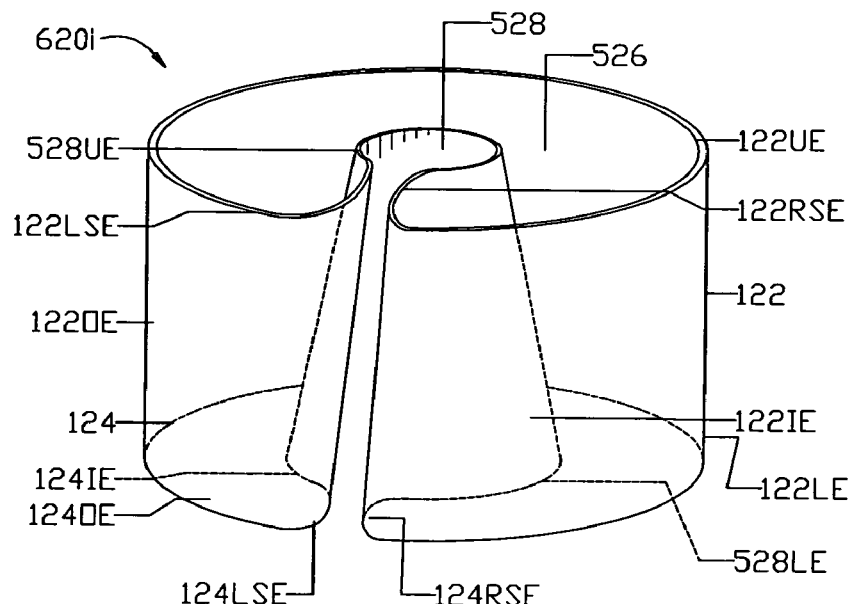

FIG. 6*i* shows top perspective view of a planter section without the left and right connecting grooves and having a curvilinear truncated upright cone shaped fixture void.

Figure 6J:
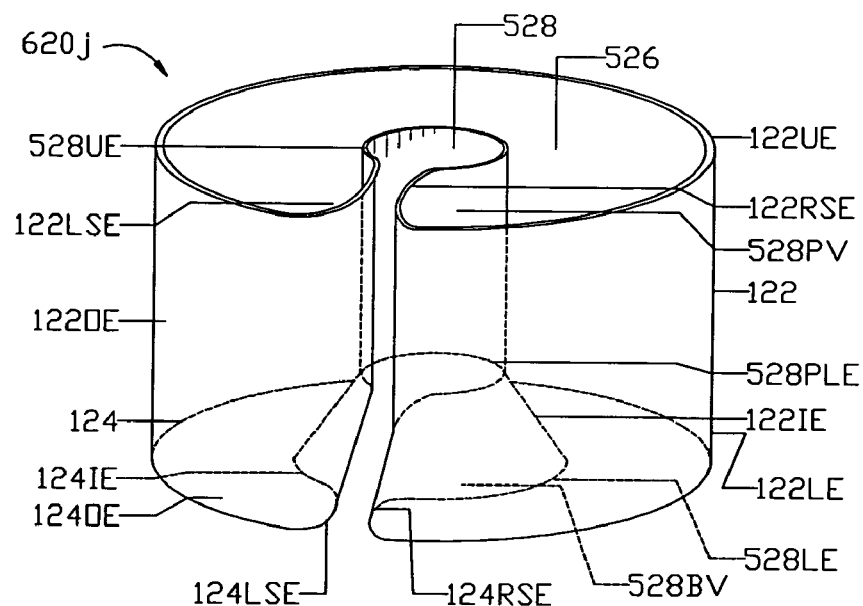

FIG. 6*j* shows top perspective view of a planter section without the left and right connecting grooves and having a curvilinear truncated upright cone shaped base void.

Figure 6K:
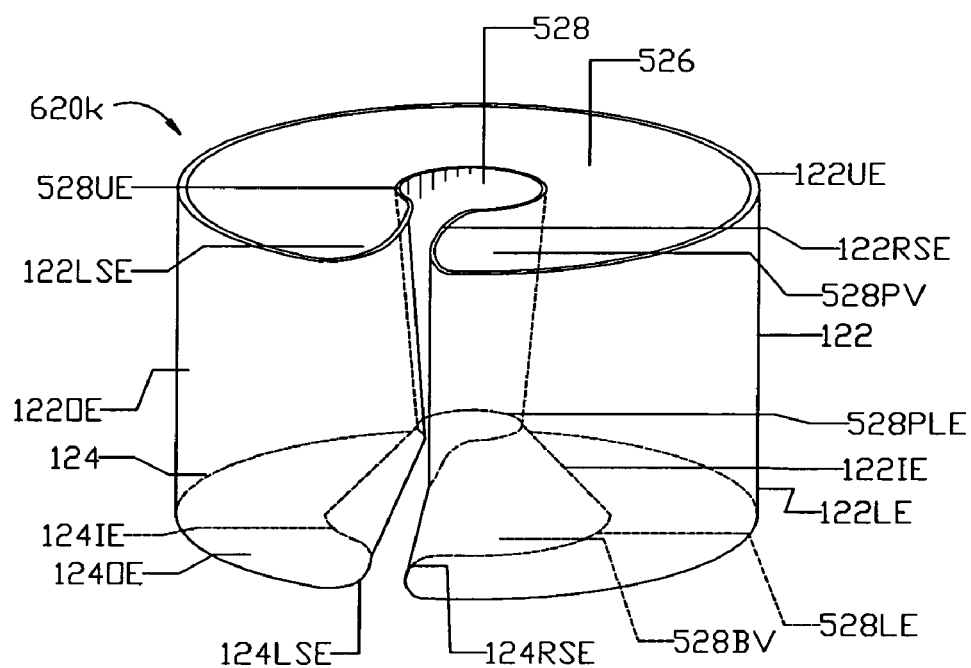

FIG. 6*k* shows top perspective view of a planter section without the left and right connecting grooves and having a truncated inverted cone shaped pole void.

Figure 6L:
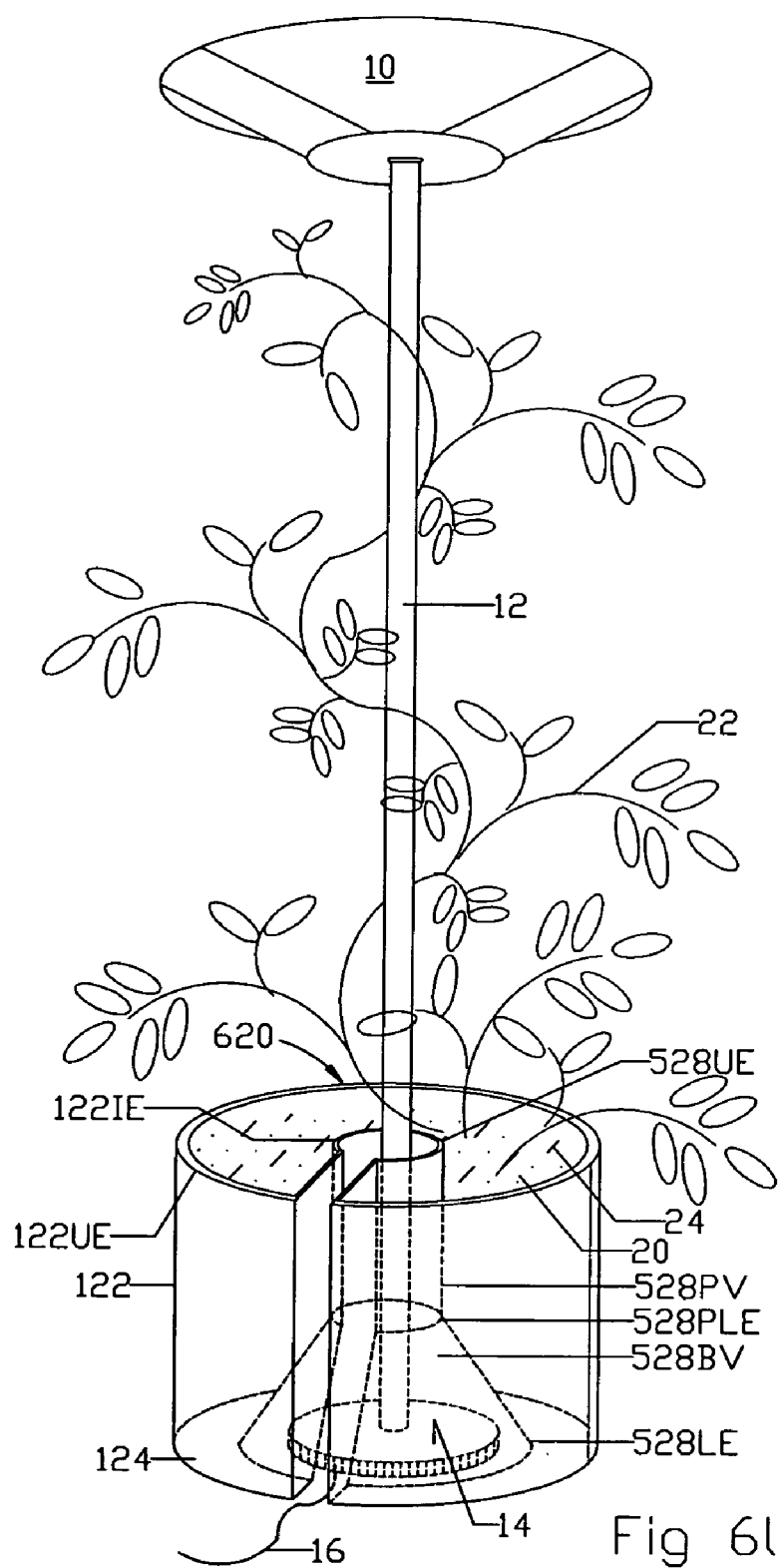

FIG. 6*l* shows top perspective view of a fully assembled planter section without the left and right connecting grooves and having a fixture void with a truncated upright cone shaped base void.

REFERENCE NUMERALS

| | |
|---|---|
| 10 | Floor Lamp |
| 12 | Pole |
| 14 | Base Stand |
| 16 | Electric Cord |
| 18 | Ballast or Soil |
| 20 | Plants or Flowers |
| 22 | Water |

DETAILED DESCRIPTION

Preferred Embodiment

FIGS. 1*a*-1*g*

A container and its component parts of the preferred embodiment of the present invention are presented in detail by FIGS. 1*a* through 1*g* of the patent drawings.

Figure 1A:
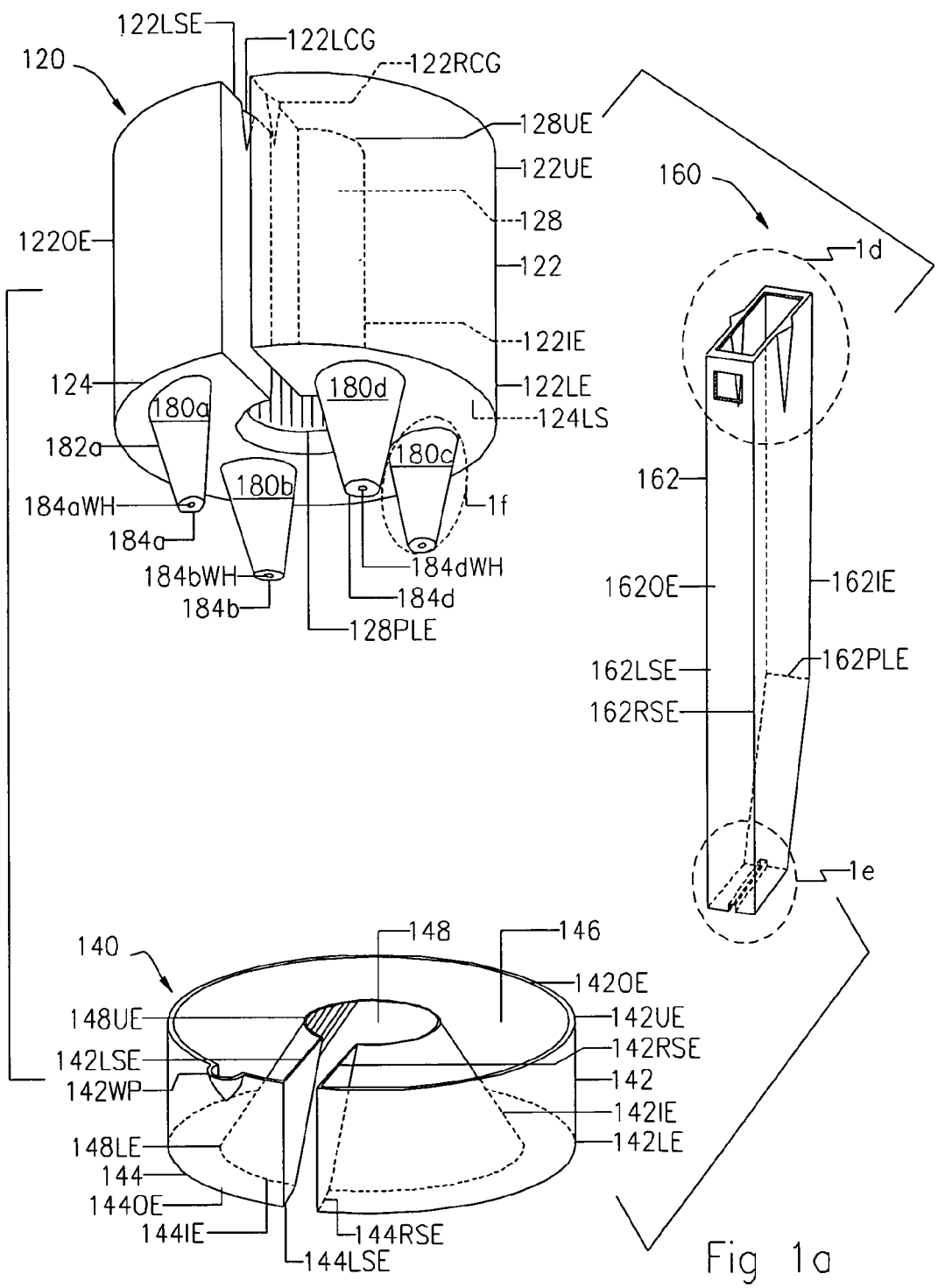

The container includes an upper planter section 120 with a plurality of truncated conically shaped circumferentially arrayed stands 180*a*, 180*b*, 180*c* and 180*d* (bottom perspective view), a lower reservoir section 140 top perspective view), and a wedge section 160 (top perspective view), all shown in FIG. 1*a*.

Figure 1B:
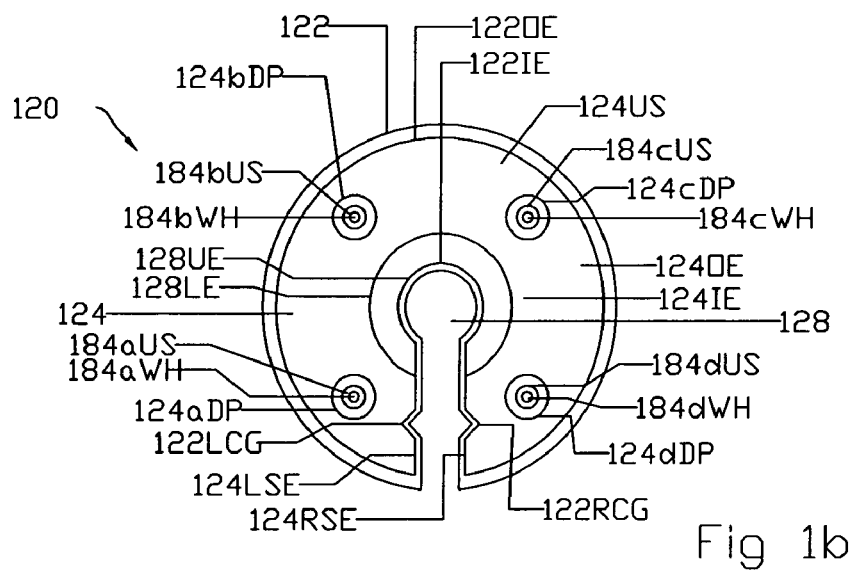
Figure 1C:
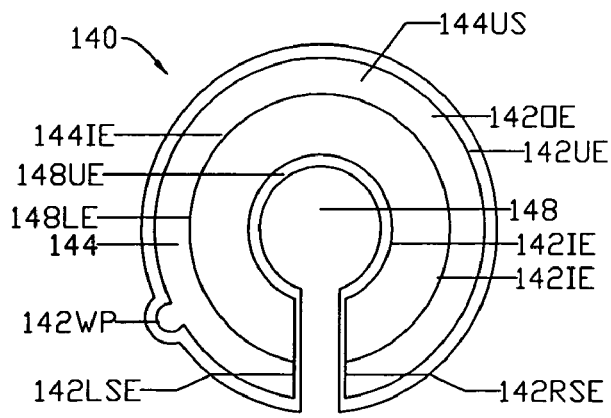

FIGS. 1*b* (top view) and 1*c* (top view), further illustrate the upper planter section 120 and lower reservoir section 140 of the container, respectively.

Figure 1D:
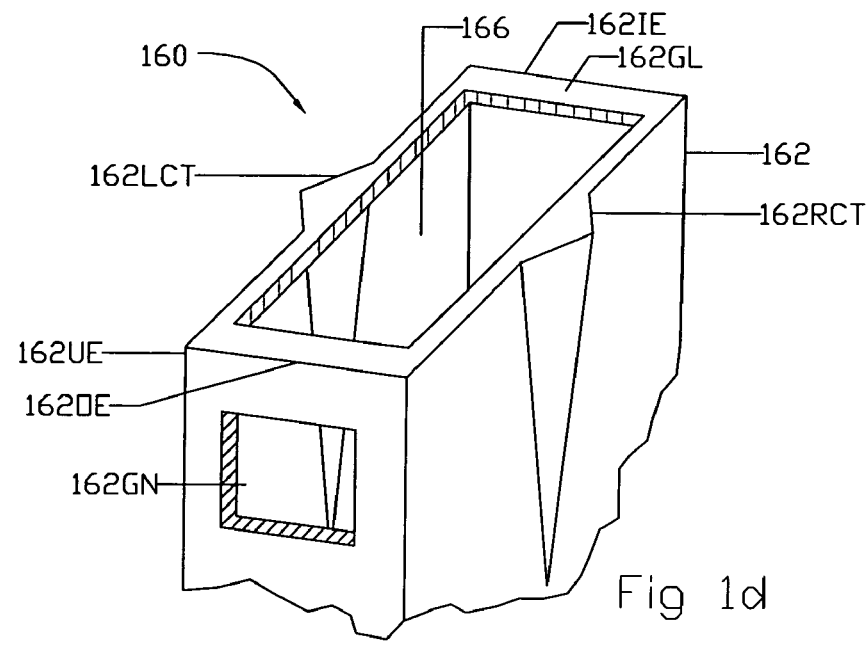

FIGS. 1*d* (top perspective view) and 1*e* (top perspective view), further illustrate the upper portion and the lower portion of the wedge section 160 of the container, respectively.

Figure 1E:
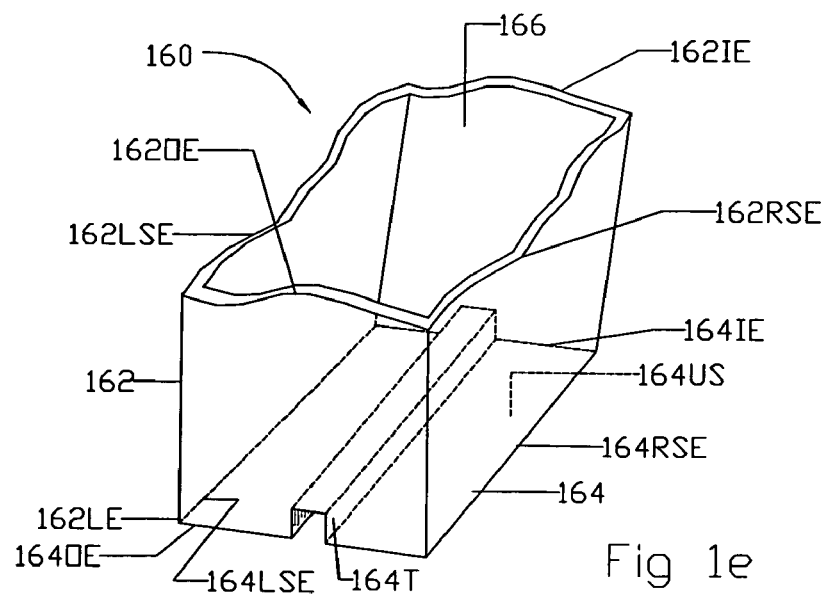
Figure 1F:
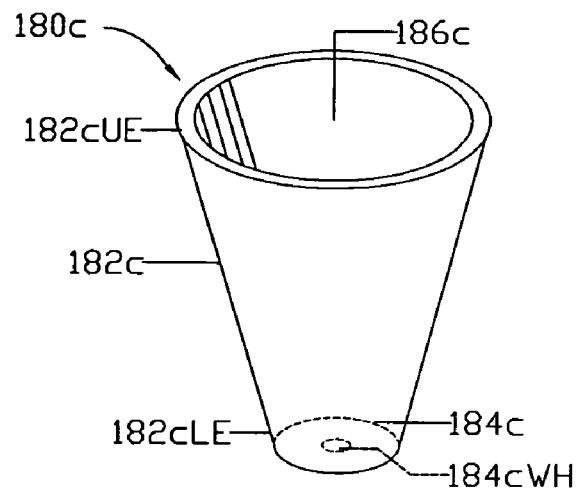

FIG. 1*f* (top perspective view) illustrates the circumferentially arrayed stand 180*c* of container 100. The circumferentially arrayed stand 180*a* or 180*b* or 180*d* of the container are identical to circumferentially arrayed stand 180*c*.

Figure 1G:
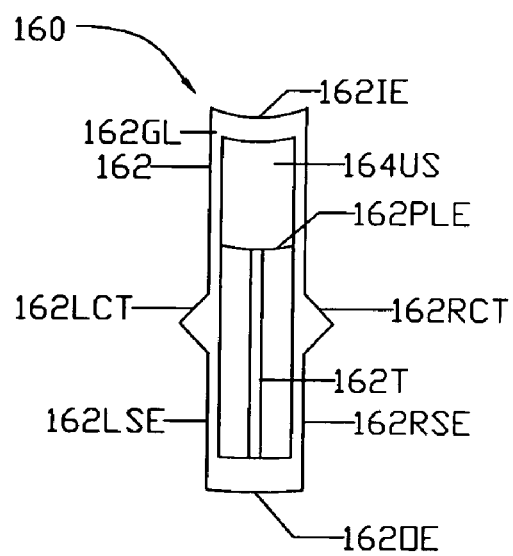

FIG. 1*g* (top view) illustrates wedge section 160 of the container.

As shown in FIGS. 1*a* and 1*e*, upper planter section 120, lower reservoir section 140, and wedge section 160, includes a sidewall 122, 142, and 162 respectively, and a base panel 124, 144, and 164 (shown in FIG. 1*e*), respectively. Sidewall 122, 142, and 162 includes an upper end 122UE, 142UE, and 162UE and a lower end 122LE, 142LE, and 162LE vertically spaced from upper end 122UE, 142UE, and 162UE.

Sidewall 122, 142, and 162 of upper planter section 120, lower reservoir section 140, and wedge section 160, respectively, further includes an inner end 122IE, 142IE, and 162IE and an outer end 122OE, 142OE, and 162OE. Inner end 122IE, 142IE, and 162IE of sidewall 122, 142, and 162 abuts a fixture such as a floor lamp 10 (not shown) after the container is fully assembled. Outer end 122OE, 142OE, and 162OE of sidewall 122, 142, and 162 sets directly opposite inner end 122IE, 142IE, and 162IE and furthest away from the floor lamp 10 (not shown) after the container is fully assembled. Inner end 162IE of sidewall 162 of wedge section 160 includes penultimate lower end 162PLE.

Sidewall 122, 142, and 162 includes a left side end 122LSE, 142LSE, and 162LSE and a right side end 122RSE, 142RSE, and 162RSE. Left side end 122LSE and 142LSE abuts left side end 162LSE of wedge section 160 after the container is fully assembled. Right side end 122RSE and 142RSE abuts right side end 162RSE of wedge section 160 after the container is fully assembled.

Upper end 142UE of outer end 142OE of sidewall 142 includes a watering port 142WP for adding water 22 into lower reservoir section 140.

Upper end 122UE of left side end 122LSE and upper end 122UE of right side end 122RSE of sidewall 122 includes a connecting groove 122LCG and 122RCG respectively. Upper end 162UE of left side end 162LSE and upper end 162UE of right side end 162RSE of sidewall 162 includes a connecting tongue 162LCT and 162RCT respectively.

Top end of outer end 162OE of sidewall 162 includes a grasping notch 162GN which provides a first means for inserting and removing wedge section 160 into and from upper planter section 120. Upper end 162UE of sidewall 162 includes a grasping ledge 162GL which provides a second means for inserting and removing wedge section 160 into and from upper planter section 120.

Base panel 124, 144, and 164, of upper planter section 120, lower reservoir section 140 and wedge section 160 respectively, includes an upper surface 124US, 144US, and 164US and a lower surface 124LS, 144LS (not shown), and 164LS (not shown) spaced from upper surface 124US, 144US and 162US.

Base panel 124, 144, and 164 further includes an inner end 124IE, 144IE, and 164IE and an outer end 124OE, 144OE, and 164OE. Inner end 124IE, 144IE, and 164IE of base panel 124, 144, and 164 abuts floor lamp 10 (not shown) after the container is fully assembled. Outer end 124OE, 144OE, and 164OE of base panel 124, 144, and 164 sets directly opposite inner end 124IE, 144IE, and 164IE and furthest away from floor lamp 10 (not shown) after the container is fully assembled.

Base panel 124, 144, and 164 further includes a left side end 124LSE, 144LSE, and 164LSE and a right side end 124RSE, 144RSE, and 164RSE. Left side end 124LSE and 144LSE abuts left side end 164LSE of wedge section 160 after the container is fully assembled. Right side end 124RSE and 144RSE abuts right side end 164RSE of wedge section 160 after the container is fully assembled.

FIG. 1f presents a detailed view of circumferentially arrayed stand 180c which is identical in structure to circumferentially arrayed stands 180a, 180b, and 180d. Circumferentially arrayed stand 180a, 180b, 180c, and 180d includes a sidewall 182a, 182b, 182c, and 182d and a base panel 184a, 184b, 184c, and 184d. Sidewall 182a, 182b, 182c, and 182d includes an upper end 182aUE, 182bUE, 182cUE, and 182dUE and a lower end 182aLE, 182bLE, 182cLE, and 182dLE vertically spaced from upper end 182aUE, 182bUE, 182cUE, and 182dUE. Base panel 124 further includes a plurality of longitudinal through-holes or drain ports 124aDP, 124bDP, 124cDP, and 124dDP shaped and positioned to coincide with the shape and position of the upper end 182aUE, 182bUE, 182cUE, and 182dUE. Drain port 124aDP, 124bDP, 124cDP, and 124dDP drain off excess water from upper planter section 120 through circumferentially arrayed stand 180a, 180b, 180c, and 180d, respectively if circumferentially arrayed stand are present, and into lower reservoir section 140.

Referring to FIGS. 1b and 1f and only showing details of circumferentially arrayed stand 180c, base panel 184a, 184b, 184c, and 184d includes an upper surface 184aUS, 184bUS, 184cUS, and 184dUS and a lower surface 184aLS, 184bLS, 184cLS, and 184dLS spaced from upper surface 184aUS, 184bUS, 184cUS, and 184dUS. Lower end 182aLE, 182bLE, 182cLE, and 182dLE of sidewall 182a, 182b, 182c, and 182d integrally attaches to base panel 184a, 184b, 184c, and 184d and upper end 182aUE, 182bUE, 182cUE, and 182dUE of sidewall 182a, 182b, 182c, and 182d integrally attaches to drain port 124aDP, 124bDP, 124cDP, and 124dDP of base panel 124 of upper planter section 120 to form a ballast volume 186a, 186b, 186c, and 186d for holding and containing ballast or soil 18 to wick water 22 into upper planter section 120 and for plants 20 to grow therein.

As shown in FIG. 1b, base panel 184a, 184b, 184c, and 184d of circumferentially arrayed stand 180a, 180b, 180c, and 180d further includes a longitudinal through-hole or weep hole 184aWH, 184bWH, 184cWH, and 184dWH for permitting water 22 to enter ballast volume 186a, 186b, 186c, and 186d of circumferentially arrayed stand 180a, 180b, 180c, and 180d and for letting water 22 drain out of circumferentially arrayed stand 180a, 180b, 180c, and 180d.

As illustrated in FIG. 1a, base panel 124 of upper planter section 120 integrally attaches to lower end 122LE of sidewall 122 of upper planter section 120 to form a ballast volume 126 and a generally longitudinal upper fixture void or pole void 128 extending into ballast volume 126 (not shown). Ballast volume 126 holds and contains ballast or soil 18 (not shown) for plants to grow therein.

Upper fixture void or pole void 128 includes an upper end 128UE and a lower end 128LE vertically spaced from the upper end 128UE. Upper fixture void or pole void 128 further includes a penultimate lower end 128PLE vertically spaced below the upper end 128UE and above the lower end 128LE. The perimeter of upper end 128UE is less than the perimeter of lower end 128LE. Upper fixture void or pole void 128 substantially surrounds a pole 12 and the upper portion of a base stand or pedestal 14 of a generally upright elongated member such as the floor lamp 10 (not shown).

Also shown in FIG. 1a, base panel 144 of lower reservoir section 140 integrally attaches to lower end 142LE of sidewall 142 of lower reservoir section 140 to form a water volume 146, and a generally latitudinal lower fixture void or base void 148 extending into water volume 146. Water volume 146 holds and contains water 22 (not shown) therein. Lower fixture void or base void 148 includes an upper end 148UE and a lower end 148LE. Lower fixture void or base void 148 substantially surrounds a base stand or pedestal 14 of a freestanding fixture such as the floor lamp 10 (not shown).

Referring to FIGS. 1a and 1e, base panel 164 of wedge section 160 integrally attaches to lower end 162LE of sidewall 162 of wedge section 160 to form a ballast volume 166 and an electric cord tunnel 164T extending into ballast volume 166 (shown in FIG. 1e). Ballast volume 166 holds and contains ballast or soil 18 (not shown) for plants to grow therein.

Operation

Preferred Embodiment

FIGS. 1a-1g

A container of the preferred embodiment, as shown in FIGS. 1a through 1g of the patent drawings, operates in the following manner.

To assemble the container, the user first lifts the empty lower reservoir section 140 and orients lower fixture void or base void 148 to align with pole 12 of freestanding fixture such as floor lamp 10. Then the user moves the empty lower reservoir section 140 toward and around pole 12 so that pole 12 is now in the center of lower fixture void or base void 148 of lower reservoir section 140. Thereafter, the user sets down the empty lower reservoir section 140 such that lower fixture void or base void 148 substantially surrounds a base stand or pedestal 14 of freestanding fixture such as floor lamp 10.

Next the user lifts the empty upper planter section 120 and orients upper fixture void or pole void 128 to align with pole 12 of a freestanding fixture such as floor lamp 10. Then the user moves the empty upper planter section 120 toward and around pole 12 so that pole 12 is now in the center of upper fixture void or pole void 128 of the empty upper planter section 120. Thereafter, the user sets down the empty upper planter section 120 on top of the empty lower reservoir section 140 such that upper fixture void or pole void 128 substantially surrounds a portion of the lower end of a pole 12 and a fractional portion of the upper end of a base stand or pedestal 14 of freestanding fixture such as floor lamp 10.

Then, the user visually ensures alignment or physically aligns gaps of upper fixture void or pole void 128 with lower fixture void or base void 148.

If the freestanding fixture has an electric cord, then the user aligns an electric cord 16, of a freestanding fixture such as the floor lamp 10, with the tunnel 164T of wedge section 160.

Using grasping notch 162GN and grasping ledge 162GL, the user then lifts the empty wedge section 160 high above upper planter section 120 and lowers it first through upper fixture void or pole void 128 of upper planter section 120 and then through lower fixture void or base void 148 of lower reservoir section 140 until connecting groove 122CG of upper planter section 120 detachably mates with connecting tongue 162CT of wedge section 160 such that an electric cord 16 of floor lamp 10 is threaded through tunnel 164T and wedge section 160 partially closes off upper fixture void or pole void 128 and lower fixture void or base void 148 of upper planter section 120 and lower reservoir section 140, respectively.

Next, the user adds ballast 18 into ballast volume 126 of upper planter section 120 and ballast volume 166 of wedge section 160. When potting soil is used as ballast 18 then user may also plant flowers or plants 20 in soil 18.

Afterward the user fills water 22 directly into ballast volume 126 of upper planter section 120 and ballast volume 166 of wedge section 160 by various watering devices.

Alternatively, the user fills sufficient amount of water 22 directly into ballast volume 166 of wedge section 160 and water volume 146 of lower reservoir section 140 through watering port 142WP by various watering devices. Water 22 in water volume 146 will seep upward by wicking through weep holes 184*a*WH, 184*b*WH, 184*c*WH, and 184*d*WH of circumferentially arrayed stands 180*a*, 180*b*, 180*c*, and 180*d* into the potting soil 18 to provide water 22 to plants and or flowers 20.

Alternate Second Embodiment

Figure 2A:
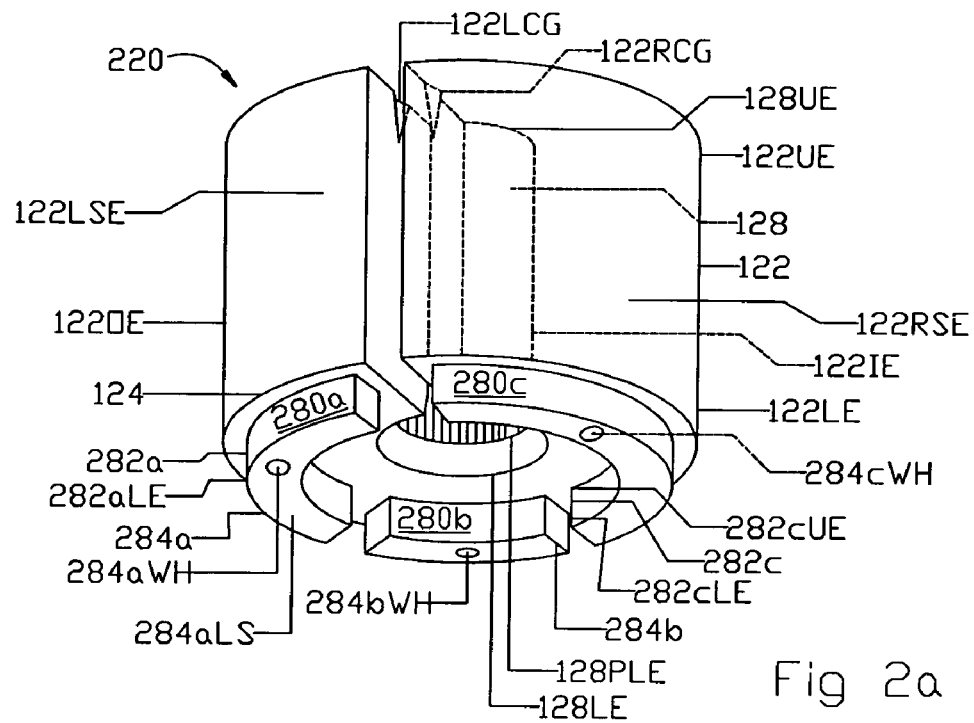
Figure 2B:
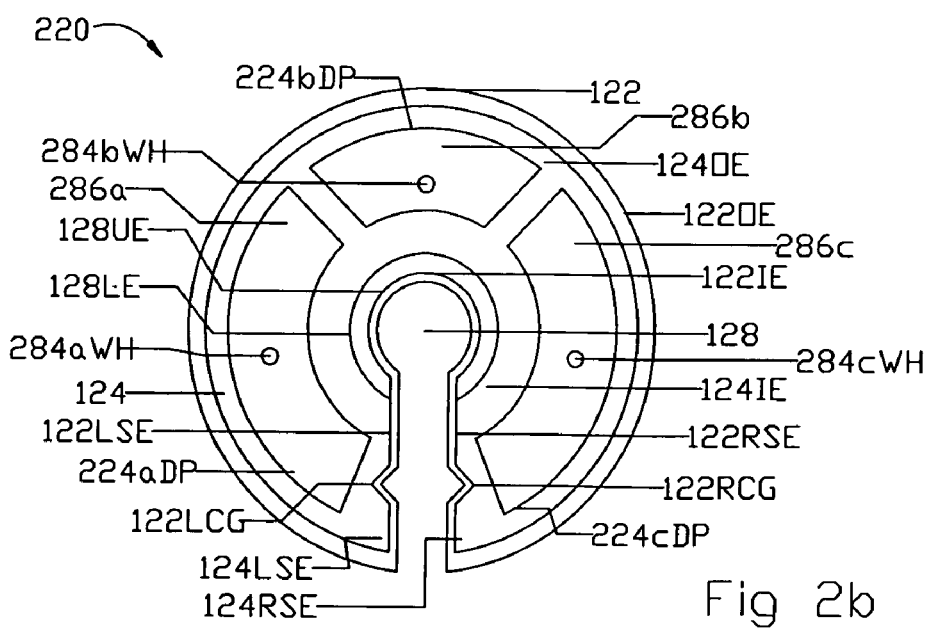

FIGS. 2*a*, 2*b*

The alternate second embodiment includes an upper planter section 220 with a plurality of tri-sectional circumferentially shaped circumferentially arrayed stands 280*a*, 280*b*, and 280*c* (bottom perspective view and top view) shown in FIGS. 2*a* and 2*b*, respectively, a lower reservoir section 140 (top perspective shown in FIG. 1*a*, and a wedge section 160 (top perspective view) shown in FIG. 1*a*.

All aspects of the second embodiment are the same as the preferred embodiment except for the shape and configuration and array of a plurality of circumferentially arrayed stands 280*a*, 280*b*, and 280*c* being tri-sectional circumferentially shaped instead of conical shaped. In all other aspects, the second embodiment is similar in structure as the preferred embodiment of the present invention.

Alternate Third Embodiment

FIGS. 3*a*, 3*b*

The alternate third embodiment includes an upper planter section 320 with a plurality of tetra-sectional circumferentially shaped circumferentially arrayed stands 380*a*, 380*b*, 380*c*, and 380*d* (bottom perspective view and top view) shown in FIGS. 3*a* and 3*b*, respectively, a lower reservoir section 140 (top perspective shown in FIG. 1*a*, and a wedge section 160 (top perspective view) shown in FIG. 1*a*.

All aspects of the third embodiment are the same as the preferred embodiment except for the shape and configuration and array of a plurality of circumferentially arrayed stands 380*a*, 380*b*, 380*c*, and 380*d* being tetra-sectional circumferentially shaped instead of conical shaped. In all other aspects, the third embodiment is similar in structure as the preferred embodiment of the present invention.

Alternate Fourth Embodiment

FIGS. 4*a*, 4*b*, 4*c*

The alternate fourth embodiment includes an upper planter section 420 and a lower reservoir section 440, both shown in top perspective view in FIG. 4*a*. FIGS. 4*b* and 4*c* show the alternate fourth embodiment in top view.

All aspects of the fourth embodiment are the same as the preferred embodiment except circumferentially arrayed stands 180*a*, 180*b*, 180*c*, and 180*d* of container 100 are excluded. Base panel 124 of upper planter section 420 is now a continuous surface with a plurality of longitudinal through-holes or drain ports 124*a*DP, 124*b*DP, 124*c*DP, and 124*d*DP.

In all other aspects, the fourth embodiment is similar in structure to the preferred embodiment of the present invention.

Alternate Fifth Embodiment

FIGS. 5*a*-5*d*

The alternate fifth embodiment includes an upper planter section 520 shown in top perspective view and top view in FIGS. 5*a* and 5*b*, respectively. Also included in the fifth embodiment is the wedge section 160 shown in top perspective view in FIG. 1*a*.

FIGS. 5*a* and 5*b* show an alternative design that combines upper planter section 120 and lower reservoir section 140 of the preferred embodiment to form a single planter section 520 of the alternate fifth embodiment.

All aspects of the fifth embodiment are the same as the preferred embodiment except the base panel 124 and attached circumferentially arrayed stands 180*a*, 180*b*, 180*c*, and 180*d*, both of the upper planter section 120, are eliminated. Another exception is the further exclusion of the watering port 142WP of the lower reservoir section 140. Additional exception is the seamless and integral attaching of lower end 122LE of sidewall 122 of upper planter section 120 to upper end 142UE of sidewall 142 of lower reservoir section 140 to form a ballast volume 526 and a fixture void 528 both of planter section 520. Fixture void 528 includes an upper end 528UE, a penultimate lower end 528PLE and a lower end 528LE. Upper end 528UE and penultimate lower end 528PLE combine to form an upper fixture void or pole void 528PV. Penultimate lower end 528PLE and lower end 528LE combine to form a lower fixture void or base void 528BV. Another exception is in the use of water volume 146 of lower reservoir section 140 in preferred embodiment as ballast volume 526 of planter section 520.

All other aspects of ballast volume 526 are the same as ballast volume 126 of the preferred embodiment. All other aspects of fixture void 528 are the same as a combination of upper fixture void or pole void 128 and lower fixture void or base void 148 of upper planter section 120 and lower reservoir section 140, respectively, of the preferred embodiment. All other aspects of planter section 520 are the same as a combination of upper planter section 120 and lower reservoir section 140, of the preferred embodiment.

There are various possibilities with regard to the shape of the fifth embodiment. For example FIG. 5*c* shows a top perspective view of planter section 520*c* shaped as a concave cylinder. FIG. 5*c* also shows a top perspective view of a corresponding wedge section 560*c* shaped such that it conforms to planter section 520*c*. For simplicity, FIG. 5*c* shows wedge section 560*c* without the electric cord tunnel 164T.

Another example, FIG. 5*d* shows a top perspective view of planter section 520*d* shaped as a truncated upright cone. FIG. 5*d* also shows a top perspective view of a corresponding wedge section 560*d* shaped such that it conforms to planter section 520*d*. For simplicity, FIG. 5*d* shows wedge section 560*d* without the electric cord tunnel 164T.

In all other aspects, the fifth embodiment is similar in structure to the preferred embodiment of the present invention.

Alternate Sixth Embodiment

FIGS. 6*a*-6*l*

The alternate sixth embodiment includes a planter section 620 (top perspective view and top view) shown in FIGS. 6*a* and 6*b*, respectively.

FIGS. 6*a* and 6*b* show an alternative design that combines upper planter section 120 and lower reservoir section 140 of the preferred embodiment to form a planter section 620 without the left and right connecting grooves 122LCG and 122RCG, respectively.

All aspects of the sixth embodiment of container 600 are the same as the preferred embodiment except wedge section 160, the left and right connecting grooves 122LCG and 122RCG, respectively, of upper planter section 120 are eliminated. Another exception is that the base panel 124 and attached circumferentially arrayed stands 180a, 180b, 180c, and 180d are also eliminated. Another exception is further exclusion of the watering port 142WP of the lower reservoir section 140. Another exception is the seamless and integral attaching of lower end 122LE of sidewall 122 of upper planter section 120 to upper end 142UE of sidewall 142 of lower reservoir section 140 to form a ballast volume 526 and a fixture void 528 both of a planter section 520. Fixture void 528 includes an upper end 528UE, a penultimate lower end 528PLE and a lower end 528LE. Upper end 528UE and penultimate lower end 528PLE combine to form an upper fixture void or pole void 528PV. Penultimate lower end 528PLE and lower end 528LE combine to form a lower fixture void or base void 528BV. Another exception is in the use of water volume 146 as ballast volume 526 of planter section 620.

All other aspects of ballast volume 526 are the same as ballast volume 126 of the preferred embodiment. All other aspects of fixture void 528 are the same as a combination of upper fixture void or pole void 128 and lower fixture void or base void 148 of upper planter section 120 and lower reservoir section 140, respectively, of the preferred embodiment. All other aspects of planter section 520 are the same as a combination of upper planter section 120 and lower reservoir section 140, of the preferred embodiment.

There are various possibilities with regard to the shape of the sixth embodiment. For example FIG. 6c shows a top perspective view of planter section 620c shaped as a quarter cylinder. Another example, FIG. 6d shows a top perspective view of planter section 620d shaped as a trapezoid.

Furthermore, there are various possibilities with regard to the shape of fixture void 528 of the sixth embodiment as illustrated in FIGS. 6e through 6h, which present top perspective view. FIG. 6e shows a planter section 620e having a truncated upright cone shaped lower fixture void or base void 528BV; FIG. 6f shows a planter section 620f having a truncated upright cone shaped fixture void 528 without the penultimate lower end 528PLE; FIG. 6g shows a planter section 620g having a thick cylindrical shaped lower fixture void or base void 528BV; FIG. 6h shows a planter section 620h having a thin cylindrical shaped lower fixture void or base void 528BV; FIG. 6i shows a planter section 620i having a curvilinear truncated upright cone shaped fixture void 528; FIG. 6j shows a planter section 620j having a curvilinear truncated upright cone shaped lower fixture void or base void 528BV; FIG. 6k shows a planter section 620k having a truncated inverted cone shaped upper fixture void or pole void 528PV; and FIG. 6l show a fully assemble planter section 620.

In all other aspects, the sixth embodiment is similar in structure to the preferred embodiment of the present invention.

ADVANTAGES OF THE PRESENT INVENTION

Thus, the reader will see that the invention resourcefully stabilizes and decorates freestanding fixtures such as floor lamps without crowding and cluttering adjoining floor space with multiple units.

The invention provides stability by minimizing wobbling of the freestanding fixture if it is bumped and by creating a contact barrier.

The invention decorates the freestanding fixture by surrounding the fixture with an attractive planter that can be filled with pretty ballast or plant life.

Also, the invention unifies a decorating theme by adapting a similar container motif to a broad range of freestanding fixtures in a room or an outdoor setting.

Furthermore, the invention easily assembles and disassembles without requiring tools, or tampering with the freestanding fixture, or mounting hardware such as screws, nails, or brackets.

In addition, the invention economizes floor space by surrounding and sharing the same general location with, not adjacent to, the freestanding fixture.

The invention further conserves floor space by obviating the need to surround a freestanding fixture with multiple container units.

CONCLUSION, RAMIFICATION, AND SCOPE OF INVENTION

While the above description contains numerous specificities, these should not be construed as limiting the scope of the invention but as merely providing illustrations of some of the presently preferred embodiments of this invention.

For example, the electric cord tunnel can have other locations instead of the base panel, such as the side of the wedge section, or on the lower side of the upper planter section that abuts the wedge section, or on the lower side of the lower reservoir section that abuts the wedge section, etc.; the wedge section can be horizontally separated into two sections, one for the upper planter section and the other for the lower reservoir section, and the lower reservoir section and its wedge section can have connecting groove and connecting tongue respectively etc.; the electric cord tunnel can have other shapes, such as truncated circle, rectangle, truncated oval, etc.; the invention can have various shapes such as a concave cylinder shape, a convex cylinder shape, a half cylinder shape, a truncated cylinder shape, a quarter cylinder shape, a right triangle shape, an equilateral triangle shape, a square shape, a rectangle shape, a truncated inverted cone shape, a truncated upright cone shape, a trapezoid shape, etc.; the connecting groove and connecting tongue can be eliminated or replaced by hinges or other connecting means which connects two otherwise unconnected sections etc.; the watering port can be eliminated or can have other shapes, such as an oval latitudinal through-hole without the protruding lip, a triangle lip, a square lip etc.; the grasping notch can be eliminated or can have a different shape, such as oval, rectangle, etc.; the invention can be made of different material, such as durable or semi-durable plastic, ceramic, wire, wicker etc.; the lower end of the upper planter section can have a diameter that is smaller than that of the lower reservoir section such that the upper planter section rests on the upper surface of the base panel of the lower reservoir section instead of resting on the upper end of the sidewall of the lower reservoir section etc.; similarly, the upper fixture void or pole void can have a diameter greater than that of lower fixture void or base void such that the lower end of upper fixture void or pole void outwardly stacks or nests with the upper end of the lower fixture void or base void; location of the fixture void or of pole void and base void together, can vary, for instance, it can be on any one of the five sides of a trapezoidal embodiment, or it can be on any one of the four sides of a rectangular embodiment, or it can be on any one of the three sides of an equilateral triangle embodiment, or it can be on anyone of the three sides on the quarter cylinder embodiment etc.; a single embodiment can have multiple fixture voids to support multiple freestanding fixtures; for embodiments with two sections, a single upper planter section can have multiple upper fixture voids or pole voids with corresponding lower fixture voids or base voids in a single lower reservoir section to support multiple freestanding fixtures; fixture void can have various shapes such as a truncated pyramid, a truncated upright cone shaped lower fixture void or base void, a truncated upright cone shaped fixture void, a thick cylindrical shaped lower fixture void or base void, a thin cylindrical shaped lower fixture void or base void, a curvilinear truncated upright cone shaped fixture void, a curvilinear truncated upright cone shaped lower fixture void or base void, a truncated inverted cone shaped upper fixture void or pole void etc.; penultimate lower end of planter section can be eliminated resulting in a fixture void such as the curvilinear truncated upright cone shaped fixture void, the truncated upright cone shaped fixture void etc.; height or depth of the lower reservoir section and specifically the lower fixture void or base void can adjust to accommodate base stands or pedestals of a freestanding fixtures, for instance, if the embodiment lacks protruding hollow legs and the freestanding fixture's pedestal is thin, the height of the lower reservoir section can be shortened to serve only as a drainage plate or tray while functionality of surrounding a base stand or a pedestal is provided by the lower portion of the upper planter section etc.; the invention can exclude both right and left connecting grooves and connecting tongues or it can exclude only the right or only the left connecting groove and connecting tongues etc.; the invention can be used with other freestanding fixtures such as floor fans, coat stands, umbrella stands, patio sun umbrellas, hat stands, etc.; the invention can be used as a display container with a bottle of wine placed in the fixture void and cheeses and fruits placed in the ballast volume, etc.; the invention can include a cover panel detachably mated to the upper end of the sidewall to close off the ballast volume, thereby creating a table surface that has a fixture void etc.; the invention can exclude the wedge section and include a cover panel detachably mated to the upper end of the sidewall to close off the top end of the fixture void, thereby creating a pet house using the fixture void etc.;

Accordingly, the scope of the invention should be determined by the appended claims and their legal equivalents, rather than by the examples given.

I claim:

1. A container or planter section for augmenting stability having a fixture void for use with a freestanding floor lamp type fixture with a pole and a pedestal or a base stand integrally attached at the lower end of said pole for anchoring support, comprising:
   (a) a sidewall defining the sides of a cavity;
   (b) said sidewall including an upper end and a lower end vertically spaced from said upper end;
   (c) said sidewall further including an inner end and an outer end directly set opposite said inner end;
   (d) said inner end of said sidewall loosely abutting lower portion of said pole and upper portion of said pedestal of said freestanding fixture after said container is fully assembled;
   (e) said outer end of said sidewall setting furthest away from said freestanding fixture after said container is fully assembled;
   (f) a base panel defining the base of said cavity;
   (g) said base panel including an upper surface and a lower surface vertically spaced from said upper surface;
   (h) said base panel further including an inner end and an outer end directly set opposite said inner end;
   (i) said inner end of said base panel loosely abutting said pedestal of said freestanding fixture after said container is fully assembled;
   (j) said outer end of said base panel setting furthest away from said freestanding fixture after said container is fully assembled;
   (k) said base panel further integrally attaching to said lower end of said sidewall forming to form a means for holding and containing ballast or soil;
   (l) said base panel further integrally attaching to said lower end of said sidewall forming a means for admitting and substantially surrounding said pedestal and lower portion of said pole of said freestanding fixture; said means for admitting and substantially surrounding comprises said fixture void;
   (m) a fixture void with an upper end (fixture void upper end) and a lower end (fixture void lower end) comprising empty space in said container or planter secton capable of admitting said pole on the upper end of the fixture void, and capable of admitting said pedestal or base stand integrally attached at the lower end of said pole at the lower end of the fixture void;
   (n) said fixture void further including a penultimate lower end vertically spaced below said upper end of said fixture void and above said lower end of said fixture void;
   (o) said fixture void upper end of said fixture void and said penultimate lower end of said fixture void integrally combining forming a means for admitting and substantially surrounding lower portion of said pole of said freestanding fixture;
   (p) said penultimate lower end of said fixture void and said lower end of said fixture void integrally combining forming a means for admitting and substantially surrounding said pedestal of said freestanding fixture;
   (q) said fixture void upper end having a perimeter approximately smaller than the perimeter of said lower end of said fixture void;
   whereby said fixture void substantially surrounds said pedestal and said pole of said freestanding fixture; and
   wherein said container additionally contains a wedge void capable of admitting at least said lower end of said pole of said floor lamp type fixture, thereby allowing said lower portion of said pole and said base stand to reach said fixture void of said container, from a position outside of said container, without disassembling said floor lamp type fixture or at least the lower portion of said container or planter section;
   wherein said container includes a wedge section for partially closing off said fixture void;
   (1) said wedge section including a sidewall defining the sides of a cavity;
   (2) said sidewall of said wedge section including an upper end and a lower end vertically spaced from said upper end;
   (3) said sidewall of said wedge section further including an inner end and an outer end set directly opposite said inner end;
   (4) said inner end of said sidewall of said wedge section further including a penultimate lower end vertically spaced below said upper end of said sidewall of said wedge section and above said lower end of said sidewall of said wedge section;
   (5) said inner end of said sidewall of said wedge section loosely abutting upper portion of said pedestal and lower portion of said pole of said freestanding fixture after said container is fully assembled;

(6) said outer end of said sidewall of said wedge section setting furthest away from said freestanding fixture after said container is fully assembled;

(7) said wedge section further including a base panel defining the base of said cavity;

(8) said base panel of said wedge section including an upper surface and a lower surface vertically spaced from said upper surface;

(9) said base panel of said wedge section further including an inner end and an outer end set directly opposite said inner end;

(10) said inner end of said base panel of said wedge section loosely abutting said pedestal of said freestanding fixture after said container is fully assembled;

(11) said outer end of said base panel of said wedge section setting furthest away from said freestanding fixture after said container is fully assembled;

(12) said base panel of said wedge section further integrally attaching to said lower end of said sidewall of said wedge section forming a means for holding and containing ballast or soil for plants to grow therein; said means for holding and containing comprises a ballast volume;

(13) said base panel of said wedge section further integrally attaching to said lower end of said sidewall of said wedge section forming a means for threading and containing therein an electric cord of said freestanding fixture;

(14) said sidewall of said container further including a left side end and a right side end;

(15) said sidewall of said wedge section further including a left side end and a right side end;

(16) said left side end of said container abutting said left side end of said wedge section after said container is fully assembled;

(17) said right side end of said container abutting said right side end of said wedge section after said container is fully assembled;

(18) said upper end of said container and said upper end of said wedge section having connecting means for detachably mating said container with said wedge section for to partially closing off said fixture void through which said pole and said pedestal of said freestanding fixture was admitted;

(19) said upper end of said outer end of said wedge section including a first grasping means for inserting and removing said wedge section into and from said fixture void of said container;

(20) said upper end of said wedge section including a second grasping means for inserting and removing said wedge section into and from said fixture void of said container;

(21) said first grasping means including a structural configuration and shape selected from the group consisting of rectangle and any polygonal shape;

(22) said upper end of said wedge section configured to fit into said container or planter section from above, and including at least one tongue or groove configured to fit into at least one corresponding tongue or groove in said container or planter section.

2. A container or planter section in accordance with claim 1, wherein said container separates into an upper planter section and a lower reservoir section;

(a) said upper planter section including a sidewall and a base panel;

(b) said sidewall and said base panel, both of said upper planter section integrally attaching forming a means for holding and containing ballast or soil for plants to grow therein; said means for holding and containing comprises a ballast volume;

(c) said sidewall and said base panel, both of said upper planter section further integrally attaching forming a means for admitting and substantially surrounding said pole and upper portion of said pedestal or base stand of said freestanding fixture; said means for admitting and substantially surrounding comprises an upper fixture void or a pole void;

(d) said base panel of said upper planter section including a means for draining excess water into said lower reservoir section;

(e) said lower reservoir section including a sidewall and a base panel;

(f) said sidewall of said lower reservoir section including an upper end and a lower end vertically spaced from said upper end;

(g) said lower end of said sidewall of said lower reservoir section and said base panel of said lower reservoir section integrally attaching forming a means for holding and containing water therein;

(h) said sidewall and said base panel, both of said lower reservoir section further integrally attaching forming a means for admitting and substantially surrounding remainder of said pedestal or said base stand of said freestanding fixture said means for admitting and substantially surrounding comprises an lower fixture void or a base void;

(i) said sidewall of said lower reservoir section further including an inner end and an outer end.

3. A container or planter section in accordance with claim 2, wherein said base panel of said upper planter section includes a plurality of circumferentially arrayed stands on the perimeter of said base panel, comprising;

(a) each of said circumferentially arrayed stands including a sidewall defining sides of a cavity;

(b) each of said sidewall including an upper end and a lower end vertically spaced from said upper end;

(c) each of said circumferentially arrayed stands further including a base panel defining base or bottom of said cavity;

(d) each of said base panel of said circumferentially arrayed stands including an upper surface and a lower surface;

(e) each of said lower end of each of said sidewall of each of said circumferentially arrayed stands integrally attaching to each of said base panel of each of said circumferentially arrayed stands; and each of said upper end of each of said sidewall of each of said circumferentially arrayed stands further integrally attaching to said base panel of said upper planter section forming a means for holding and containing ballast or soil; and said means for holding and containing coinciding with said means for draining excess water; and said means for holding and containing comprises a ballast volume;

(f) each of said base panel of each of said circumferentially arrayed stands including a means for wicking water upward and through soil, from said lower reservoir section into said upper planter section.

4. A container or planter section in accordance with claim 2, wherein said lower fixture void further includes a structural configuration or shape selected from the group consisting of a truncated cone, a cylinder of varying height and any polygonal shape.

5. A container or planter section in accordance with claim 2, wherein said upper fixture void further includes a structural configuration or shape selected from the group consisting of a truncated cone, a cylinder and any polygonal shape.

6. A container or planter section in accordance with claim 2, wherein said upper end of said outer end of said sidewall of said lower reservoir section including a means for adding water into said lower reservoir section; and said means forming a watering port or opening for irrigating plants.

7. A container or planter section in accordance with claim 3, wherein each of said circumferentially arrayed stands includes a structural configuration or shape selected from the group consisting of conical shape, tri-sectional circumferential shape, tetra-sectional circumferential shape, and any polygonal shape.

8. A container or planter section in accordance with claim 1, wherein said container further including a structural configuration or shape selected from the group consisting of a straight sided cylinder shape, a quarter cylinder shape, a trapezoid shape, and any polygonal shape.

9. A container or planter section in accordance with claim 1, wherein said container further includes a structural configuration or shape selected from the group consisting of a straight sided cylinder, a concave cylinder, a truncated upright cone and any polygonal shape; and said wedge having a structural configuration or shape complementing said selected shape of said container.

10. A method of augmenting stability to a freestanding fixture having a pole and a pedestal, or a weighted foot, or a base stand, such as a floor lamp, comprising;
    (a) providing a container of the type comprising a sidewall and a base panel;
    (b) integrally attaching said sidewall to said base panel;
    (c) forming a ballast volume and a fixture void extending into said ballast volume;
    (d) inserting ballast or soil or content into said ballast volume;
    (e) inserting said freestanding fixture into said fixture void;
        whereby said fixture void of said container admits and substantially surround said pedestal or said base stand and lower portion of said pole of said freestanding fixture such that said freestanding fixture is constrained from tipping over if accidentally bumped;
        wherein said container additionally contains a wedge void capable of admitting at least said lower end of said pole of said floor lamp type fixture, thereby allowing said lower portion of said pole and said base stand to reach said fixture void of said container, from a position outside of said container, without disassembling said floor lamp type fixture or at least the lower portion of said container;
        further comprising a detachable wedge section, said wedge section capable of being inserted into and/or being removed from said wedge void from above without tools and without disassembling either said container or said pole with a spread base;
        in which said wedge section is also capable of holding ballast; and
        in which said wedge section additionally has at least one tongue or groove configured to fit into at least one corresponding tongue or groove in said container.

11. A container or a planter section for a freestanding fixture having a pole and a pedestal, or a weighted foot, or a base stand, such as a floor lamp, said container comprising;
    (a) a sidewall and a base panel;
    (b) said sidewall integrally attached to said base panel;
    (c) said container further comprising a ballast volume and a fixture void extending into said ballast volume;
    (d) said ballast volume capable of holding ballast or soil content;
    (e) said fixture void capable of receiving and holding said freestanding fixture;
        whereby said fixture void of said container admits and substantially surrounds said pedestal or said base stand and lower portion of said pole of said freestanding fixture such that said freestanding fixture is constrained from tipping over if accidentally bumped;
        wherein said container additionally contains a wedge void capable of admitting at least said lower end of said pole of said floor lamp type fixture, thereby allowing said lower portion of said pole and said base stand to reach said fixture void of said container, from a position outside of said container, without disassembling said floor lamp type fixture or at least the lower portion of said container;
        further comprising a detachable wedge section, said wedge section capable of being inserted into and/or being removed from said wedge void from above without tools and without disassembling either said container or said pole with a spread base;
        in which said wedge section is also capable of holding ballast; and
    in which said wedge section additionally has at least one tongue or groove configured to fit into at least one corresponding tongue or groove in said container.

12. A container or planter section in accordance with claim 11, wherein said container further includes a structural configuration or shape selected from the group consisting of a straight sided cylinder, a concave cylinder, a truncated upright cone and any polygonal shape; and said wedge having a structural configuration or shape complementing said selected shape of said container.

13. A container or planter section in accordance with claim 11, wherein said container separates into an upper planter section and a lower reservoir section;
    (a) said upper planter section including a sidewall and a base panel;
    (b) said sidewall and said base panel, both of said upper planter section integrally attaching forming a means for holding and containing ballast or soil for plants to grow therein; said means for holding and containing comprises a ballast volume;
    (c) said sidewall and said base panel, both of said upper planter section further integrally attaching forming a means for admitting and substantially surrounding said pole and upper portion of said pedestal or base stand of said freestanding fixture; said means for admitting and substantially surrounding comprises an upper fixture void or a pole void;
    (d) said base panel of said upper planter section including a means for draining excess water into said lower reservoir section;
    (e) said lower reservoir section including a sidewall and a base panel;
    (f) said sidewall of said lower reservoir section including an upper end and a lower end vertically spaced from said upper end;
    (g) said lower end of said sidewall of said lower reservoir section and said base panel of said lower reservoir section integrally attaching forming a means for holding and containing water therein;

(h) said sidewall and said base panel, both of said lower reservoir section further integrally attaching forming a means for admitting and substantially surrounding remainder of said pedestal or said base stand of said freestanding fixture said means for admitting and substantially surrounding comprises an lower fixture void or a base void;

(i) said sidewall of said lower reservoir section further including an inner end and an outer end.

14. A container or planter section in accordance with claim 13, wherein said base panel of said upper planter section includes a plurality of circumferentially arrayed stands on the perimeter of said base panel, comprising;

(a) each of said circumferentially arrayed stands including a sidewall defining sides of a cavity;

(b) each of said sidewall including an upper end and a lower end vertically spaced from said upper end;

(c) each of said circumferentially arrayed stands further including a base panel defining base or bottom of said cavity;

(d) each of said base panel of said circumferentially arrayed stands including an upper surface and a lower surface;

(e) each of said lower end of each of said sidewall of each of said circumferentially arrayed stands integrally attaching to each of said base panel of each of said circumferentially arrayed stands; and each of said upper end of each of said sidewall of each of said circumferentially arrayed stands further integrally attaching to said base panel of said upper planter section forming a means for holding and containing ballast or soil; and said means for holding and containing coinciding with said means for draining excess water; and said means for holding and containing comprises a ballast volume;

(f) each of said base panel of each of said circumferentially arrayed stands including a means for wicking water upward and through soil, from said lower reservoir section into said upper planter section.

15. A container or planter section in accordance with claim 13, wherein said upper end of said outer end of said sidewall of said lower reservoir section including a means for adding water into said lower reservoir section; and said means forming a watering port or opening for irrigating plants.

16. A container or planter section in accordance with claim 14, wherein each of said circumferentially arrayed stands includes a structural configuration or shape selected from the group consisting of conical shape, tri-sectional circumferential shape, tetra-sectional circumferential shape, and any polygonal shape.

* * * * *